(12) United States Patent
Caldwell

(10) Patent No.: US 11,084,576 B2
(45) Date of Patent: Aug. 10, 2021

(54) HYDRAULIC MULTI-ROTOR AERIAL VEHICLE

(71) Applicant: FLOWCOPTER LTD., Edinburgh (GB)

(72) Inventor: Niall James Caldwell, Midlothian (GB)

(73) Assignee: FLOWCOPTER LTD., Edinburgh (GB)

( * ) Notice: Subject to any disclaimer, the term of this patent is extended or adjusted under 35 U.S.C. 154(b) by 456 days.

(21) Appl. No.: 16/121,434

(22) Filed: Sep. 4, 2018

(65) Prior Publication Data
US 2019/0071172 A1 Mar. 7, 2019

(30) Foreign Application Priority Data
Sep. 4, 2017 (GB) ...................................... 1714174

(51) Int. Cl.
*B64C 27/64* (2006.01)
*B64C 27/52* (2006.01)
(Continued)

(52) U.S. Cl.
CPC .............. *B64C 27/64* (2013.01); *B64C 27/00* (2013.01); *B64C 27/08* (2013.01); *B64C 27/12* (2013.01);
(Continued)

(58) Field of Classification Search
CPC ......... B64C 27/64; B64C 27/00; B64C 27/08; B64C 27/12; B64C 27/52; B64C 39/024; B64D 35/00
See application file for complete search history.

(56) References Cited

U.S. PATENT DOCUMENTS 3,211,399 A * 10/1965 Eickmann ............... B64C 27/12
                                                     244/17.23
3,253,806 A    5/1966 Eickmann
(Continued)

FOREIGN PATENT DOCUMENTS

CA    1125256    6/1982
FR    2651139    3/1991
(Continued)

OTHER PUBLICATIONS

Search Report dated Jan. 15, 2018 from corresponding application No. GB1714174.8.

*Primary Examiner* — Justin M Benedik
(74) *Attorney, Agent, or Firm* — Hauptman Ham, LLP

(57) ABSTRACT

A multi-rotor aerial vehicle comprises at least two rotors, a controller, a power supply having an output shaft, a shaft-driven hydraulic machine coupled to the output shaft and at least two rotor-driving hydraulic machines coupled to respective rotors. At least one of the hydraulic machines is an electronically commutated hydraulic machine in which displacement of hydraulic fluid through each working chamber is regulated by electronically controllable valves, during each cycle of working chamber volume, in phased relationship to cycles of working chamber volume. The controller controls the electronically controllable valves of the electronically commutated hydraulic machines to independently control the rotation of the rotors. The shaft-driven hydraulic machine may be an electronically commutated machine with a plurality of independent outputs, which independently drive the rotor-driving hydraulic machines. The rotor-driving hydraulic machines may be electronically commutated machines the displacement of which is independently controlled to independently drive the rotors.

20 Claims, 11 Drawing Sheets

(51) Int. Cl.
*B64C 27/00* (2006.01)
*B64D 35/00* (2006.01)
*B64C 39/02* (2006.01)
*B64C 27/08* (2006.01)
*B64C 27/12* (2006.01)

(52) U.S. Cl.
CPC ............ *B64C 27/52* (2013.01); *B64C 39/024* (2013.01); *B64D 35/00* (2013.01); *B64C 2201/024* (2013.01); *B64C 2201/027* (2013.01); *B64C 2201/04* (2013.01); *B64C 2201/108* (2013.01)

(56) References Cited

U.S. PATENT DOCUMENTS

| | | | | |
|---|---|---|---|---|
| 3,801,046 | A | * | 4/1974 | Eickmann ........... B64C 29/0016 244/17.23 |
| 4,171,784 | A | | 10/1979 | Eickmann |
| 4,173,321 | A | * | 11/1979 | Eickmann ............... B64C 11/28 244/17.23 |
| 4,982,914 | A | * | 1/1991 | Eickmann .............. B64D 31/14 244/56 |
| 2016/0101854 | A1 | | 4/2016 | Du |
| 2018/0016022 | A1 | * | 1/2018 | Ljung ................... B64C 39/024 |

FOREIGN PATENT DOCUMENTS

| | | |
|---|---|---|
| GB | 1110165 | 4/1968 |
| WO | 2012/023065 | 2/2012 |
| WO | 2015/040360 A1 | 3/2015 |
| WO | 2016/068767 | 5/2016 |

\* cited by examiner

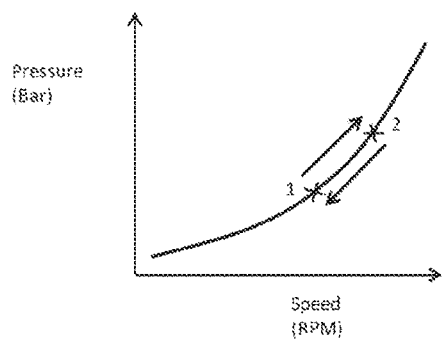
Fig. 16
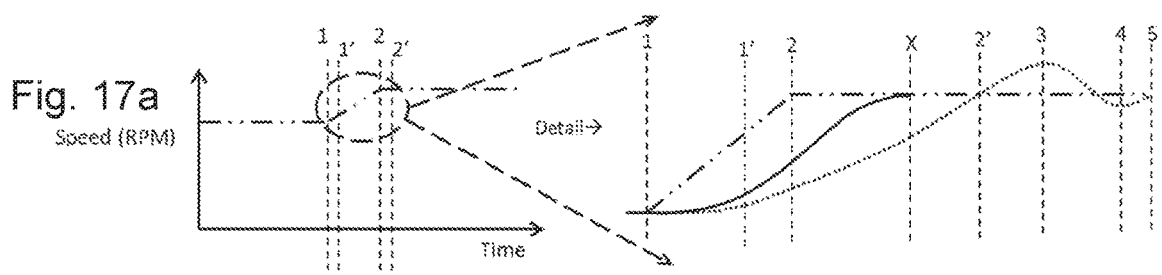
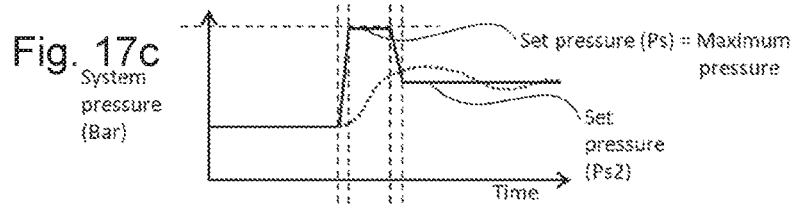
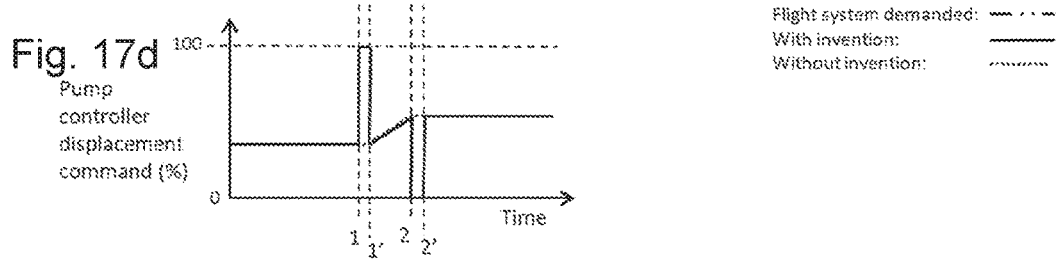

HYDRAULIC MULTI-ROTOR AERIAL VEHICLE

RELATED APPLICATIONS

The present application claims the priority of Great Britain Application No. 1714174.8, filed Sep. 4, 2017, which is incorporated herein by reference in its entirety.

FIELD OF THE INVENTION

A multi-rotor is a rotorcraft with more than two rotors. The invention relates to multi-rotor aerial vehicles (sometimes known as multi-copters) with hydraulic drives for the rotors.

BACKGROUND TO THE INVENTION

Hydraulic multicopters have been known for some years, for example from U.S. Pat. No. 3,253,806 (Karl Eickmann). Recent multicopter interest has been in the field of drones for delivery and recreational purposes, and in the field of personal flight vehicles (the latter may also be called personal air vehicle, PAVs or personal aerial vehicles).

Conventional electrical multicopters have a lithium battery, and at least 4 rotors powered by electric motors, the speed of which is controlled by switching converters in order to vary the thrust. In order to stabilise the flight, it is necessary to have very fast response control of the motor speed.

Typical desired characteristics of multicopters include: stable position and attitude holding, rejection of wind gusts, rapid response to control inputs, long range, long loiter time, and large payload.

Such electric multicopter machines are successful at small scale, for applications such as aerial photography which require a payload of a few kilogrammes, with typical continuous power ratings of less than 1 kW. Flying time is typically limited by battery capacity to less than 30 minutes. If it is desired to scale up to carry a significant payload, or to have longer flight time, then problems emerge due to the low power and energy storage density of electrical technology.

Electrical machines are limited in power density by thermal dissipation. The ratio of surface area to volume dictates that small motors can dissipate heat more easily than large ones. Therefore large electric motors cannot reach high power density without complicated and heavy liquid cooling arrangements at larger scales. So, more powerful electric drives have lower specific power (typically delivering 0.5 to 1.0 kW continuous per kg), which causes an increase in aircraft weight, and therefore increases power required from the batteries.

Compared to liquid fuel, electric batteries stiffer from much lower energy density, and also suffer from overheating at higher power levels and so require heavy active cooling systems. This results in very limited flight time for electric multirotors with larger payload capacity.

Alternatively, it is possible to replace the electric system with a hydraulic system. An internal combustion engine, fed by a fuel tank, powers a variable displacement hydraulic pump; multiple valves deliver fluid to hydraulic motors powering each rotor. It is known that, for a given weight limit, the combination of a liquid fuel tank and an IC (Internal Combustion) engine can deliver much more energy than an electric battery. It is also known that hydraulic motors offer higher power density than electrical motors, typically more than 6 kW per kg. This allows higher rotor power, and therefore payload, without a weight penalty.

Despite these attractions, hydraulic systems suffer from important disadvantages for this application.

Hydraulic systems in known systems, with multiple independent loads typically suffer from poor efficiency, because the pressure from a single pump is throttled by proportional valves to control each individual hydraulic motor. Even if a separate pump is supplied for each hydraulic motor, the use of throttling valves to control the flow to the motor causes energy losses due to pressure drop of the throttle. This poor energy efficiency would result in high fuel consumption, reducing the advantage of the higher energy storage capacity of the liquid fuel.

Due to internal friction, hydraulic valves typically suffer from hysteresis, stiction, non-linearity and other sources of inaccuracy between the commanded flow and the actual flow. Thus a conventional hydraulic transmission would give poor quality control of the motor speed. However, multicopters make extreme demands on the accuracy of the control of motor speed. Multicopters quickly integrate any small error of commanded thrust from each motor, resulting in undesired yaw, pitch or roll, and subsequent undesired translation.

Further, due to internal damping, hydraulic valves typically respond slowly to commands, which results in a phase lag in the control loop, which limits the loop gain which can be applied before oscillation occurs. Therefore a conventional hydraulic transmission would give slow control of the motor speed, resulting in poor stabilisation, position holding and rejection of wind gusts. It is difficult to control conventional hydraulic systems more quickly without further reducing energy efficiency. Flapper-nozzle servo valves are capable of high control bandwidth, but do so by introducing even larger pressure drop, dropping system energy efficiency well below 50%.

When the multirotor is hovering, the speed commands to each of the rotors will typically be continuously modulated by small corrections (of the order of 1% or less of full range) which are needed to maintain constant attitude rate, attitude, altitude rate, altitude, velocity, and position. These small correction commands must be faithfully followed by the rotor to result in stable control. Surprisingly, the inventors of the current invention have found by simulation that the above non-ideal characteristics of proportional hydraulic valves cause instability and inaccurate control of a multirotor. The non-linearities of the proportional valve response cause overwhelming distortion of the small signals, which results in the buildup of errors in each of the control loops and the emergence of unstable limit cycling behaviour. The delays of the proportional valve response cause phase lag, which reduces the stability margin, necessitating much lower loop gains than would otherwise be chosen, ultimately resulting in inaccurate control of the aerial vehicle.

As an alternative to using proportional valves to control the individual motor speeds, it would be possible to provide separate variable-displacement pumps, each dedicated to supply fluid to a single hydraulic motor. Such variable-displacement pumps would typically be of the axial piston swashplate type, whereby a hydraulic actuator positions the angle of the swashplate such that the stroke of the pistons is varied to deliver the flowrate required of the hydraulic motor. This configuration has the merit of reducing the system energy losses by eliminating the pressure drop in the proportional valves.

However, the inventors have surprisingly found that the control quality which would result from such system would be even more inadequate than in the case of using proportional throttle valves. The hydraulic actuator of the pump swashplate is typically positioned by providing actuation fluid from a proportional valve. Such valves suffer from the same non-linearities and delays which have been mentioned previously. In addition, after the proportional valve delays and non-linearities, the swashplate mechanism itself introduces additional delays and non-linearities due to friction, high alternating moments from the piston pressures, and inertia of the mechanism. The result is that swashplate control systems are typically highly damped and exhibit hysteresis, deadband and an inability to reproduce small command signal variations. Although it is conceptually fully variable, a swashplate pump may exhibit hysteresis, deadband and other distortions amounting to 5% of its full range. This would mean for instance that if subject to a 2% change in command signal, the output flow of such a swashplate pump would be unchanged. In a multirotor, this would result in the buildup of error in the flight controller control loops, until the commanded variation exceeded 5% of the previous pump flow. Once the stiction of the mechanism was overcome, the swashplate would suddenly start moving, increasing the flow to the motor. This would result in the correction of the previously built up errors, resulting in the command signal returning to a neutral value indicating that no further change was required. However, now it had started to move, the swashplate actuator would tend to continue due to inertia, and would tend to keep moving even after the commanded variation reversed direction. The result would be a limit cycle, whereby the non-linearity and delay of the swashplate actuator causes the buildup of increasing alternating attitude errors.

The inventors have found that use of proportional valves to control the speed of the motors, either to throttle the flow from a pump or to control the displacement of a variable pump, would cause unacceptable control of the motor speed, causing poor response to operator inputs, poor tolerance to wind gusts, large variation of altitude and ground position when hovering. The multirotor would wobble in attitude, attitude and ground position, resulting in hazard to the multirotor, its payload and bystanders, failure to be a stable platform for cameras and other sensors, and may result in failure to complete its mission.

The inventors have also found that the swashplate pumps can cause instability of the engine control and unwanted coupling of the engine control dynamics to the aircraft altitude control dynamics. When the engine speed increases, it is the natural response of the swashplate to stay at the same angle, resulting in the same displacement of fluid per revolution of the pump. This means that speed changes of the engine result in a proportional change of flow supplied by the pumps to the motors. Therefore whatever perturbations occur of the engine speed, will cause a similar perturbation to the rotor speeds. Such perturbations will cause errors of aircraft altitude, which in a hovering situation close to the ground may be dangerous. In principle, such unwanted coupling of the dynamics of the engine speed and the rotor speed may be counteracted by use of an electronic controller to correct the swashplate actuator command. However, the slow response of the swashplate to command signals and the relatively fast speed changes of the engine means that the inventors have found there is insufficient control bandwidth to effectively counteract the unwanted coupling.

Flight controllers are typically digital, and send their output command signals in a digital form. In order to interface with a variable displacement pump, or a proportional valve, it is necessary to convert the digital command signal to an analog signal. This signal must then be amplified such that enough current is generated to drive the solenoid of the proportional valve. The inventors have found that each analog conversion and amplification step adds further delay, and introduces possible error such as offsets, deadband and uncertain gain factors. Therefore the use of an analog control method further degrades the control quality which can be achieved.

In addition, the inventors have found that the use of multiple independent variable displacement pumps results in mechanically complex system due to the requirement for each pump to be driven from the engine. With a minimum of four rotors required to stabilise a multirotor, it is necessary to drive at least four pumps from a single engine. Typically an engine may only drive a load from one end of the crankshaft, the other being occupied with engine accessory drives. It may be thought to drive all four pumps end-to-end with through drive shafts. However, such a chain of shafts in sequence may cause torsional oscillations and excessive backlash, as well as overstressing the final pump shaft interface to the engine because it must carry the load of all four pumps. In alternative to this, it may be that the pumps are driven by pinions running on a common gear driven by the engine. However, this increases weight and also adds to backlash and torsional oscillation. Additionally, there is unwanted complexity from the provision of at least four independent variable displacement swashplate pumps, each with its own shaft seals, bearings, crankcase temperature monitoring, swashplate actuator and associated proportional valve and solenoid amplifier. Failure of any one of the multiple pumps will likely cause a catastrophic crash of the aircraft. Therefore having multiple pumps exponentially increases the overall likelihood of an accident.

An IC engine delivers power as a function of its rotation speed. However it reaches highest efficiency when it turns at the lowest speed which can satisfy the instantaneous power required. It is possible to operate the engine constantly at high rotational speed regardless of the power demand, but this would result in lower overall fuel efficiency. Ideally the engine should operate at variable speed. (When referring to speed in respect of the IC engine or other prime mover, we refer to rotational speed). In low power demand situations, typically such as descent, an IC engine should turn at low speed for best efficiency; in high power demand situations, such as ascent, an IC engine should turn at high speed for highest power output. In order to accelerate the engine from low to high speed, it is necessary for the engine to produce more torque than the pump for a short period such that the inertia of the engine accelerates. The inventors have found that this control of engine speed is difficult and inaccurate due to the low response speed of the variable displacement hydraulic pump, which makes variable-speed operation more difficult. A faster response of the pump would therefore enable more efficient fuel usage of the engine.

Ideally, both pump and engine would respond instantly to an electronic signal from a controller tasked to control the engine speed. However, typical variable displacement hydraulic pumps typically respond slowly to such a demand due to the multiple conversions and amplifications which such signals must pass through from a purely electronic demand, to an actual actuation force capable of moving the swashplate of a typical variable displacement pump. The result of slow response is poor regulation of the engine speed, which may result in poor speed control of the engine, and in the limit, stalling and overspeed which may be disastrous. As noted previously, poor engine speed control will cause poor rotor speed control, causing instability of the overall air vehicle control.

IC engines also cannot change their output torque instantaneously due to inherent delays such as induction-to-power delay, inertia of the air induction path, turbocharger delay, and the finite response of the throttle butterfly. To achieve good control of the engine speed, it is desired that the pump be an active control element in the engine speed governor function. That is, that the pump both provides sufficient flow to the motor and responds to requests from the governor function to modulate its torque to help control engine speed.

An ideal hydraulic transmission for a multicopter would be light weight, would not have unnecessary mechanical complexity or failure modes, would combine high quality, accurate, and fast control of the rotor speed, with high energy efficiency with multiple independent loads, with fast accurate control of the pump displacement and the engine torque such as to control the overall load balance on the engine such as to stably regulate its speed, all under the direct control of a digital electronic controller with the minimum of digital/analog conversions Without high frequency motor control, the craft will quickly destabilise and suffer from loss of flight control or undesirable flight characteristics (it may not fly). It is important to be able to set the rotor speed accurately, to meet a specific demanded speed, providing a particular thrust in the air, thus achieving a particular rate of ascent/descent/other craft motion.

Failure of control of a multi-rotor aerial vehicle drivetrain, to respect one or both of 1) the required bandwidth, and 2) the required rotor speed, will lead to loss of flight control or undesirable flight characteristics, which is unacceptable.

The invention seeks to provide a multicopter which has advantageous control accuracy, response time, mechanical complexity and reliability, and reduced weight. Some embodiments aim to improve energy efficiency and/or stored energy density and/or maximum power output.

SUMMARY OF THE INVENTION

According to a first aspect of the present invention there is provided a multi-rotor aerial vehicle comprising:
at least two rotors which generate aerodynamic thrust on the vehicle (during operation),
a controller, a power supply, an output shaft driven by the power supply, and at least one shaft-driven hydraulic machine mechanically coupled to the output shaft,
at least two rotor-driving hydraulic machines each of which drives a respective rotor,
wherein the at least two rotor-driving hydraulic machines are hydraulically coupled to and thereby driven by the at least one shaft-driven hydraulic machine,
at least one of said hydraulic machines being an electronically commutated hydraulic machine,
the at least one electronically commutated machine comprising a plurality of working chambers of cyclically changing volume and one or more fluid outlets or inlets, each said fluid outlet or inlet being fluidically connected to a respective group of said working chambers, wherein the displacement of hydraulic fluid through each working chamber is regulated by one or more electronically controllable valves, during each cycle of working chamber volume, in phased relationship to cycles of working chamber volume, to thereby regulate the net displacement of hydraulic fluid through the fluid outlets or inlets,
wherein the controller controls the electronically controllable valves of the at least one electronically commutated hydraulic machine to thereby independently control the flow of hydraulic fluid through the respective hydraulic machines to thereby independently control the speed of rotation of the at least two rotors.

In a second aspect, the present invention there extends to a method of operating a multi-rotor aerial vehicle, the multi-rotor aerial vehicle comprising: at least two rotors which generate aerodynamic thrust on the vehicle (during operation), a controller, a power supply, an output shaft driven by the power supply, and at least one shaft-driven hydraulic machine mechanically coupled to the output shaft, at least two rotor-driving hydraulic machines each of which drives a respective rotor, wherein the at least two rotor-driving hydraulic machines are hydraulically coupled to and thereby driven by the at least one shaft-driven hydraulic machine, at least one of said hydraulic machines being an electronically commutated hydraulic machine, the at least one electronically commutated machine comprising a plurality of working chambers of cyclically changing volume and one or more fluid outlets or inlets, each said fluid outlet or inlet being fluidically connected to a respective group of said working chambers, wherein the displacement of hydraulic fluid through each working chamber is regulated by one or more electronically controllable valves, during each cycle of working chamber volume, in phased relationship to cycles of working chamber volume, to thereby regulate the net displacement of hydraulic fluid through the fluid outlets or inlets,
the method comprising the step (typically carried out by the controller) of controlling the electronically controllable valves of the at least one electronically commutated hydraulic machine to thereby independently control the flow of hydraulic fluid through the respective hydraulic machines to thereby independently control the speed of rotation of the at least two rotors.

It may be that the at least one shaft-driven hydraulic machine is a said electronically commutated hydraulic machine, and the working chambers of the at least one shaft-driven hydraulic machine comprise at least a first group of one or more working chambers connected to a first fluid outlet which is hydraulically coupled to (a fluid inlet of) and thereby drives a first rotor-driving hydraulic machine which drives a first rotor, and the at least one shaft-driven hydraulic machine also comprises at least a second group of one or more working chambers connected to a second fluid outlet which is hydraulically coupled to (a fluid inlet of) and thereby drives a second rotor-driving hydraulic machine which drives a second rotor, and
wherein the electronically controlled valves of the first and second groups of working chambers are controlled (typically by the controller) to independently control the net displacement of hydraulic fluid through the first and second fluid outlets, thereby independently driving the first rotor-driving hydraulic machine and second rotor-driving hydraulic machine and thereby independently controlling the respective speed of rotation of the first and of the second rotors.

Thus, in this case, there are independent supplies of hydraulic fluid from the one or more shaft-driven hydraulic machines to the two or more rotor-driving hydraulic machines. The rotor-driving hydraulic machines might be passive hydraulic machines (e.g. hydraulic motors), which are not electronically commutated or electronically controlled. They may be fixed displacement (e.g. receive a volume of hydraulic fluid per rotation which is substantially constant). They may be controlled only by the supply of hydraulic fluid to an inlet. Nevertheless, they may in some embodiments also be said electronically commutated hydraulic machines.

It may be that the at least two rotor-driving hydraulic machines are each said electronically commutated hydraulic machines, and which have fluid inlets which are hydraulically coupled to the same one or more fluid outlets of the at least one shaft-driven hydraulic machine such that they receive hydraulic fluid from and are driven by a common fluid supply, and wherein the electronically controlled valves of the at least two rotor-driving hydraulic machines are controlled (typically by the controller) to independently control the net displacement of working fluid by the rotor-driving hydraulic machines and thereby independently control the speed of rotation of the respective rotors driven by the at least two rotor-driving hydraulic machines.

The electronically controlled valves of the at least two rotor-driving hydraulic machines enable control of the fluid between the shaft-driven hydraulic machine outlet and the rotor-driving hydraulic machine inlet, and specifically enable control of flow and pressure of the fluid. Thus, in combination with control of the shaft-driven hydraulic machine, the flow and pressure in between can be controlled, and with an accumulator fluidly connected, therefore provides a means of energy storage (for later use, by any fluidly connected hydraulic machine) which in combination with the electronically controlled valves of at least one electronically commuted machine allows the hydraulic pressure to be varied independently of the rotor speed (as determined by the speed of the rotor driving hydraulic machines). The size of the accumulator volume (provided by accumulator or accumulators), directly determines its total energy capacity, and is selected in relation to the rest of the hydraulic system such that if the shaft driven hydraulic machine stops functioning and supplying pressurised hydraulic fluid, the rotor-driving hydraulic machines may be supplied with pressurised hydraulic fluid instead sourced from the pressurised accumulator. The specific size may be selected such that period of time that the rotors can be driven by the accumulator system is in the range 2 to 5 seconds, for example approximately 3 seconds.

Thus, although the at least two rotor-driving hydraulic machines receive a common supply of hydraulic fluid from the at least one shaft-driven hydraulic machine (driven in turn by the power supply through the output shaft), the speed of rotation of the respective rotors can be independently controlled. The common supply may be formed by multiple groups of working chambers hydraulically coupled to multiple fluid outlets, which are connected in parallel to provide a combined flow (output or input) of hydraulic fluid.

In use, the shaft-driven hydraulic machine(s) (which could alternatively be described as first hydraulic machines) receive power from the power supply through the output shaft during normal operation and supply hydraulic fluid through the outlet(s) to the at least two rotor-driving hydraulic machines (although in some embodiments the shaft driven machine(s) may sometimes motor and thereby regenerate power, and source high pressure hydraulic fluid back through the outlets). The rotor-driving hydraulic machine(s) (which could alternatively be described as second hydraulic machines) drive the rotors, using hydraulic power supplied received through the inlet(s) by the at least one shaft driven hydraulic machine (again in some embodiments the rotor-driving hydraulic machine(s) may sometimes pump back through the inlet(s), regenerating energy from the rotors).

The at least two rotors are independently controlled. The at least two rotors may be fixed pitch rotors. It may be that one or more of the hydraulic motors drives one or more additional rotors as well as a respective one of the at least two rotors.

The power supply comprises a power source. Typically the power supply comprises a prime mover such as an electric motor or internal combustion engine. The power supply applies torque to the output shaft in use to thereby drive the driven hydraulic machine.

Typically the said electronically commutated hydraulic machine(s) have a phase sensor (e.g. a shaft position sensor) which measures the phase of cycles of working chamber volume.

It may be that the at least one shaft driven hydraulic machine comprises a plurality of working chambers axially distributed along a single rotatable shaft coupled to (for example integral to) the output shaft of the power supply.

The plurality of working chambers axially distributed along a single rotatable shaft may comprise a plurality of banks of working chambers which banks are axially spaced along the rotatable shaft. It may be that the working chambers in each bank are connected to the same fluid outlet, to thereby define a plurality of independent working fluid outlets from or inlets to the respective hydraulic machine.

It may be that the said one or (or all) of the electronically commutated hydraulic machines has a body, the body encompassing the one or more working chambers and the electronically controllable valves of the hydraulic working machine, the body having a pair of bearings mounted thereto, with all working chambers of the machine located between the pair of bearings and without additional bearings between the working chambers.

It may be that each working chamber of the one or more shaft-driven hydraulic machines which are mechanically coupled to the output shaft are located between a pair of bearings. It may be that there are no additional bearings between the working chambers.

Essentially there is no need for an additional bearing within the body, between banks for example, when the shaft is sufficiently supported and constrained by the bearings located outside the (banks of) the working chambers. There are at least two groups of cylinders (or working chambers), which are axially (along the shaft) located between the axial location of each of the pair of shaft bearings. There may be more than two bearings.

It may be that the multi-rotor aerial vehicle, further comprises one or more orientation sensors wherein the controller is configured (e.g. programmed) to process the output of the one or more orientation sensors and to control the electronically controlled valves to control the displacement of hydraulic fluid by the electronically commutated hydraulic machine(s) to thereby regulate the stability, orientation and/or direction of movement of the multi-rotor aerial vehicle. The method may comprise controlling the electronically controlled valves responsive to the output of one or more orientation sensors to regulate the stability, orientation and/or direction of movement of the multi-rotor aerial vehicle.

The one or more orientation sensors may for example comprise one or more gyroscopes, magnetometers, accelerometers and or global satellite positioning system receivers for satellite and or base station transmissions. The output from a multi-axis accelerometer may be processed to determine the direction of gravity and therefore the orientation of the vehicle.

It may be that the electronically controlled valves of the said electronically commutated hydraulic machine(s) are controlled to control the displacement of hydraulic fluid by the electronically commutated hydraulic machines such as to balance the net force exerted by the rotors.

Balancing the net force on the rotors is a definition to encompass the idea that an aerial vehicle requires stabilisation of attitude and altitude change, and changing the net force on the rotors would be to change the altitude (or at least the total upwards force the rotors provide), and a change in the balance of the net force on the rotors is to change the attitude (for example by increasing the force on one side, and decreasing on the other which will lead to a rapid change in attitude).

It may be that the multi-rotor aerial vehicle has a total of four rotors, wherein each rotor is driven by a respective rotor-driving hydraulic machine, and each rotor-driving hydraulic machine is driven by an independent output of hydraulic fluid from the one or more shaft-driven hydraulic machines which are mechanically coupled to the output shaft of the power supply.

It may be that the rotational direction of each of the rotors is arranged such that it is possible to achieve a zero rotational movement of the multi-rotor aerial vehicle.

As is known in conventional multicopters, a pair of counter clockwise rotating rotors is typically combined on the same aerial vehicle with another pair of clockwise rotating rotors. The rotation of the rotor mass in air generates a torque effect on the vehicle in the opposite direction. This torque effect is the same as a yaw force on the vehicle. Balancing the torque effect, by having equal numbers of clockwise as of counter clockwise rotating rotors, provides a balance of the total yaw arising from the rotors acting on the aerial vehicle.

It may be that the at least one shaft-driven hydraulic machine(s) have a common drive shaft and the axis of rotation of the drive shaft is substantially parallel to the mean of the direction of the axis of rotation of the at least two rotors.

It may be that the speed of rotation of the output shaft and/or the power output of the power supply is varied (typically by the controller, which is configured for the purpose) to provide just enough power for hovering, typically plus a predetermined margin; and to then increase the speed of rotation of the output shaft and/or the power output of the power supply whenever higher power is required or is forecast to be required for acceleration, climbing or maneuvering.

It may be that the electronically commutated hydraulic machine(s) are controlled to independently regulate the torque generated by each of the two or more rotor-driving hydraulic machines.

The multi-rotor aerial vehicle may comprise an accumulator in fluid communication with the fluid connection between the (outlet(s) of) at least one shaft-driven hydraulic machine and (the inlet(s) of) one or more of the at least two rotor-driving hydraulic machines.

It may be that some or all of the shaft-driven hydraulic machines are pump-motors, at least one of those pump-motors is connected to an accumulator and the pump-motor(s) connected to an accumulator can be operated in a pumping mode to store pressurised fluid in the accumulator and then later motored, driven by pressurised fluid from the accumulator, to provide transient additional power, to supplement the power output by the power supply.

It may be that the rate of displacement from individual groups of one or more working chambers is controlled using open-loop feedback to produce a set flow-rate, to thereby control the thrust generated by the respective rotors, the rotor-driving hydraulic machines are fixed displacement, and these fixed displacement machines turn at a speed which is proportional to the rate of fluid flow from the respective group of one or more working chambers to the respective rotor-driving hydraulic machine, and the controller queries stored conversion data which relates a target thrust or variable related to thrust to pump flow-rate, and controls the flow rate of hydraulic fluid from the respective group of one or more working chambers through the fluid outlet to the respective rotor-driving hydraulic machine accordingly.

It may be that some or all of the rotor-driving hydraulic machines are partially encompassed within the body of the multi-rotor aerial vehicle, and so are at least partially surrounded by material, and the multi-rotor aerial vehicle body comprises a ring cam drive arrangement and the rotor has an annular ring at its periphery, which comprises a part of the ring cam drive arrangement, and thus the rotor ring is part of the respective hydraulic machine, directly driven by the cylinders of some or all of the rotor-driving hydraulic machines.

It may be that the rate of displacement by each group of working chambers is controlled by flow-rate, or by closed-loop rotor-driving hydraulic machine speed control, but with a set pressure limit at the respective fluid outlet, using a pressure transducer which measures the pressure of the hydraulic fluid output through the fluid outlet.

It may be that, to control the thrust of a respective rotor, the rate of displacement of hydraulic fluid by the respective group of one or more working chambers through a fluid inlet is controlled using closed-loop feedback to maintain a target pressure using feedback from a pressure transducer which measures the pressure of hydraulic fluid output by the respective group of one or more working chambers through the respective fluid inlet.

It may be that, to control the thrust of a respective rotor, the rate of displacement of hydraulic fluid by the respective group of one or more working chambers through a respective fluid outlet is controlled using closed-loop feedback to obtain a target rotor speed, using a rotor speed transducer.

It may be that the rate of displacement by each shaft-driven hydraulic machine is controlled by flow-rate, or by closed-loop rotor driving hydraulic machine speed control, but with a set pressure limit at the output of the respective shaft-driven hydraulic machine, implemented by closed-loop control of the rate of displacement of the shaft-driven hydraulic machine, using a pressure transducer which measures the pressure of the high pressure connection between the shaft-driven hydraulic machine and respective rotor-driving hydraulic machine.

It may be that the controller is configured to implement (and the method may comprise implementing) an anti-stall procedure in which the torque generated by the one or more shaft-driven hydraulic machines is limited in response to determining that the speed of rotation of the output shaft meets one or more (prime mover) stall risk criteria.

It may be that the controller is programmed to cause (and the method may comprise causing) the one or more shaft-driven hydraulic machines to make no net displacement of working fluid when the speed of rotation of the output shaft is below a minimum speed.

It may be that, in some circumstances, for example in response to determining that one or more prime mover failure criteria are met, the controller operates some of the rotor-driving hydraulic machines as pumps and the hydraulic fluid output by the respective rotor-driving hydraulic machine(s), acting as pumps, is used to drive the working chambers of one or more groups of working chambers of the one or more shaft-driven hydraulic machines which are fluidly connected to those rotor-driving hydraulic machine(s) acting as pump, and wherein when the common shaft is rotating, other groups of working chambers, driven in effect by the rotors, use the received energy to drive rotor-driving hydraulic machines and thereby rotors.

It may be that (e.g. the controller may be configured such that) in response to a rotor demand speed increase from a first lower level to a second higher level, the flowrate delivered by the common outlet of the one or more shaft-driven hydraulic machines to which a rotor-driving hydraulic machine is connected, is commanded by the controller to exceed the flowrate corresponding to the steady-state flowrate of the second higher level of speed, for a period of time.

The commanded flowrate may be commanded to exceed the steady-state flowrate of the second higher level of speed, for a brief period only.

It may be that (e.g. the controller may be configured such that) in response to a rotor demand speed decrease from a first higher level to a second lower level, the flowrate delivered by the one or more groups of working chambers connected to the common hydraulic fluid outlet to which the respective rotor-driving hydraulic machine is connected, is commanded by the controller to decrease below the flowrate corresponding to the steady-state flowrate of the second lower level of speed, for a period of time.

The commanded flowrate is commanded to decrease below the steady-state flowrate of the second lower level of speed, for a brief period only. The flowrate may be regulated to obtain a target pressure or shaft rotation speed (i.e. the displacement is selected to meet a target pressure or shaft rotation speed rather than a target flow rate).

Optional features described above relate to both the first and second aspects of the invention. The controller may be configured (e.g. programmed) to implement the method steps.

DESCRIPTION OF THE DRAWINGS

An example embodiment of the present invention will now be illustrated with reference to the following Figures in which:

FIG. 16 is a graph showing pressure:speed relationship.

FIG. 17a is a graph of speed against time.

FIG. 17b is a magnified view of a portion of the graph shown in FIG. 17a.

FIG. 17c is a graph of motor pressure against time.

FIG. 17d is a graph of pump controller displacement command against time.

DETAILED DESCRIPTION OF AN EXAMPLE EMBODIMENT

Figure 1:
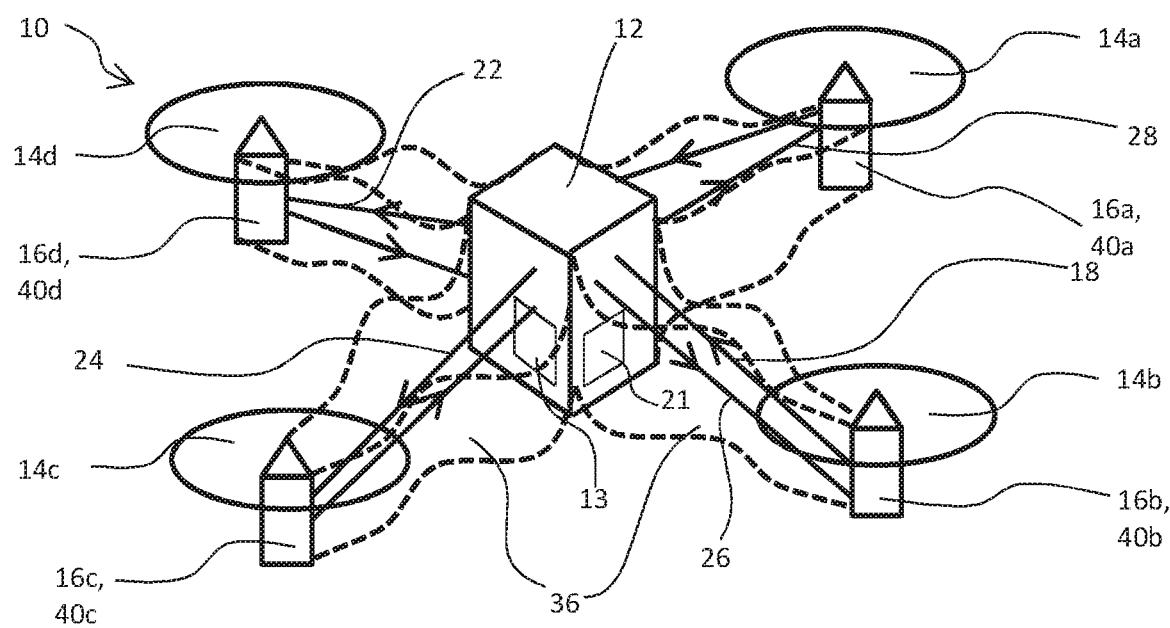
FIG. 1 is a schematic diagram of key components of a multi-rotor aerial vehicle.

With reference to FIG. 1, a multi-rotor aerial vehicle (multicopter) 10 has a core 12, containing a power supply 13 and controller 15. Rotors 14a, 14b, 14c, 14d are spaced apart around the body and driven to rotate in use by respective hydraulic motors 40a, 40b, 40c, 40d (functioning as the rotor-driving hydraulic machines) which are held in place by arms 36 extending from the body, or by another structural support/chassis. Each of the motors 40a, 40b, 40c, 40d could be of bent-axis type (shown with individual rotors in FIG. 1).

The power supply 13 might be one or more batteries driving an electrical motor (in which case the electrical motor functions as prime mover 20) and/or a fuel tank and internal combustion engine (in which case the internal combustion engine functions as prime mover 20). The internal combustion engine may be a reciprocating engine or gas turbine.

Hydraulic conduits 22, 24, 26, 28 extend from outlets of individual pumps (30a, 30b, 30c, 30d) in the core of the multicopter to supply pressurised fluid to respective hydraulic motors to drive those motors, and low pressure conduits 18 extend back from the output of the motors to the hydraulic pump apparatus, to return hydraulic fluid.

Figure 2A:
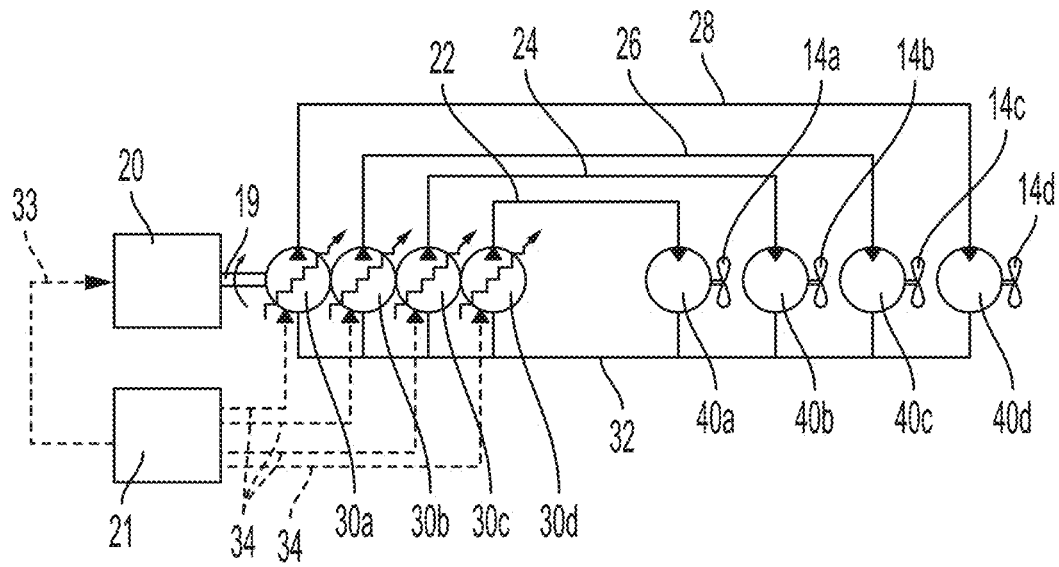
FIG. 2A is a hydraulic circuit diagram of a first configuration, using fixed displacement hydraulic motors
Figure 2B:
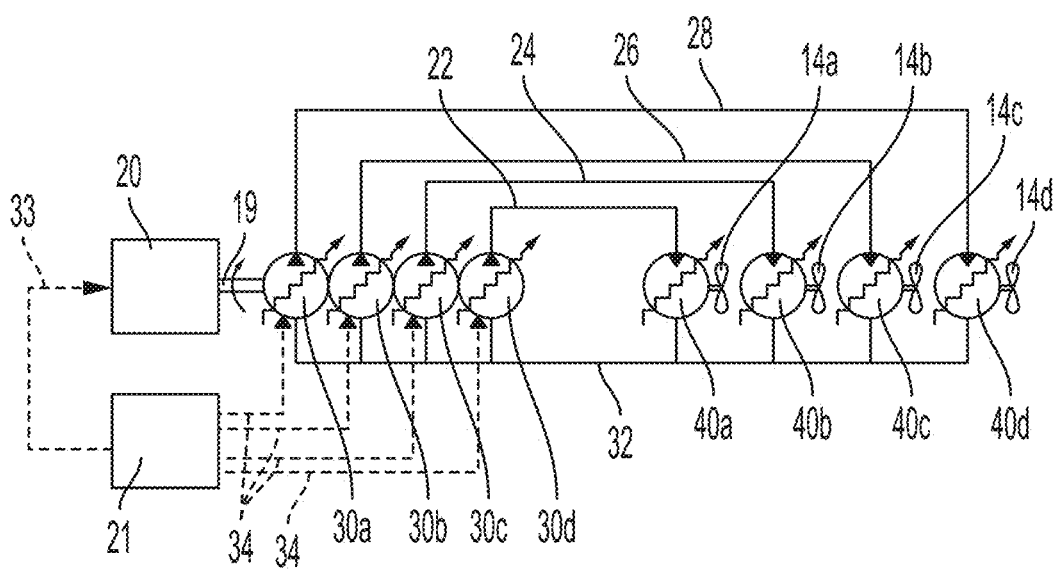
FIG. 2B is a diagram of corresponding configuration using synthetically commutated hydraulic motors.

With reference to FIGS. 2A and 2B, an electric motor 20, under the control of the controller 15, drives a shaft 19 which drives four banks of cylinders, each bank having a separate hydraulic inlet and hydraulic outlet, connected to the cylinders of the respective bank, and so functioning as an individually controllable pumps 30a, 30b, 30c, 30d. The pumps 30a, 30b, 30c, 30d function as the shaft-driven hydraulic machines. In this example, the electric motor and pumps have a common shaft (functioning as the output shaft of the electric motor and input shaft of the pumps), although they may have separate shafts coupled by a gearing arrangement (for example). By common shaft, we mean either a single continuous component, or a plurality of components which are keyed to one another which are torque connected to transmit torque. Typically these components with be coaxial, however with gearing between components the coaxial alignment is not necessary. In this example, the respective pumps are formed by cylinders divided into separate banks, with the cylinders which form an individual bank having a common fluid input and common fluid output and so functioning as a discrete pump, however it would be equally possible for the inputs and output of groups of cylinders from different banks (from some, or all cylinders on those banks) to be connected together to form pumps. Furthermore, the grouping of cylinders to form pumps need not be fixed, but may for example be varied using control valves. It is advantageous from the view of minimum weight as well as elimination of multiple failure modes if each group of cylinders is arranged around a common crankshaft sharing common bearings, housing and shaft seals.

In the embodiment of FIG. 2A the hydraulic motors are driven simply by the pressure of the working fluid which they receive from the respective pumps, and in particular they are not electronically commutated machines. In the embodiment of FIG. 2B the hydraulic motors are (like the pumps) electronically commutated machines which have a rate of displacement which is independently controllable by actively controlling electronically controlled valves. This provides an additional level of control (allowing the pressure in the hydraulic conduit between the respective pump and the respective hydraulic motor and the rate of displacement by the hydraulic motor to be independently varied, e.g. controlling torque and power output).

Figure 3A:
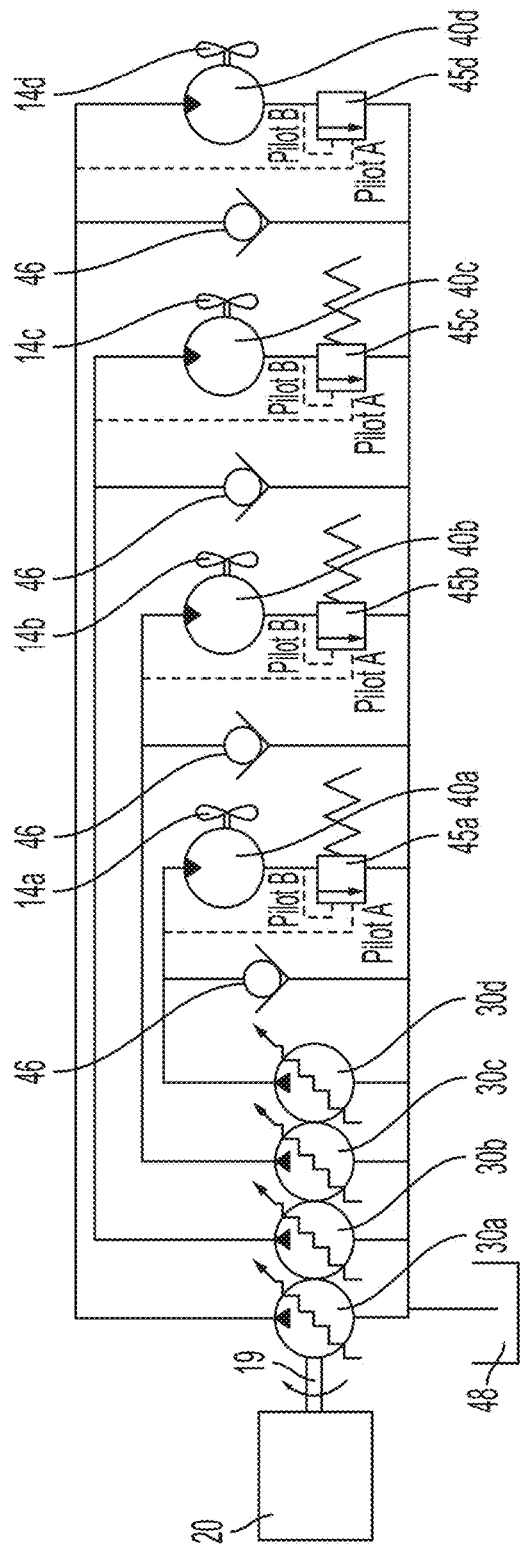
FIG. 3A is a hydraulic circuit diagram of a second configuration, using fixed displacement hydraulic motors
Figure 3B:
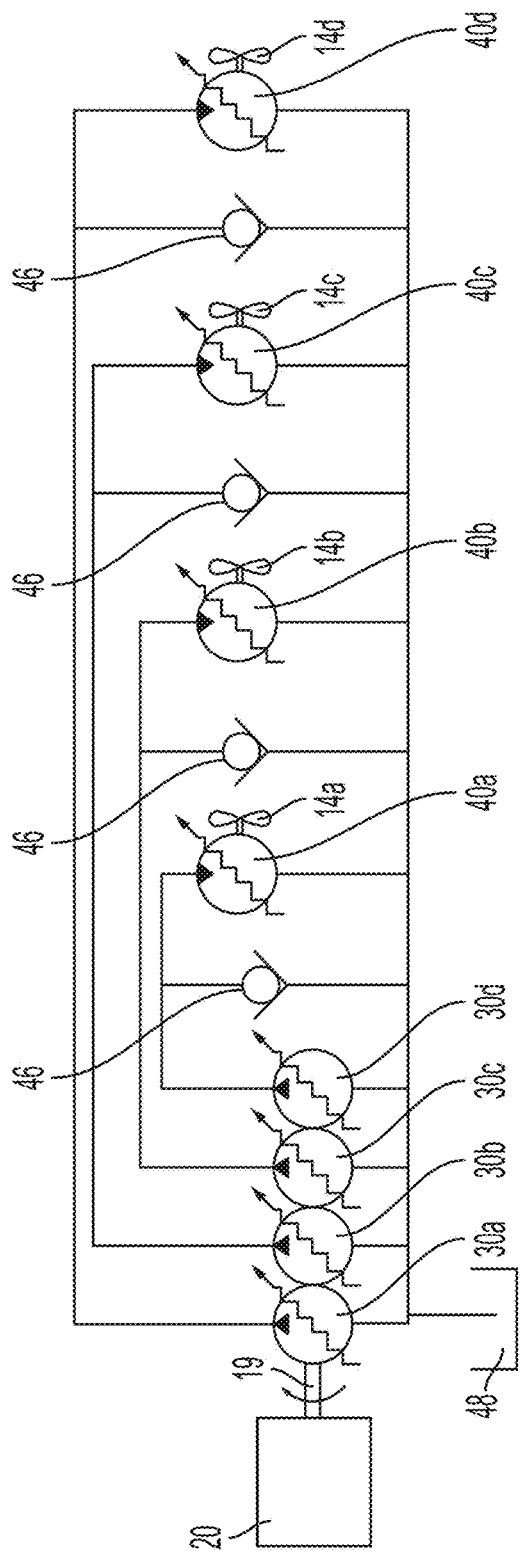
FIG. 3B is a diagram of a corresponding configuration using synthetically commutated hydraulic motors.
Figure 3C:
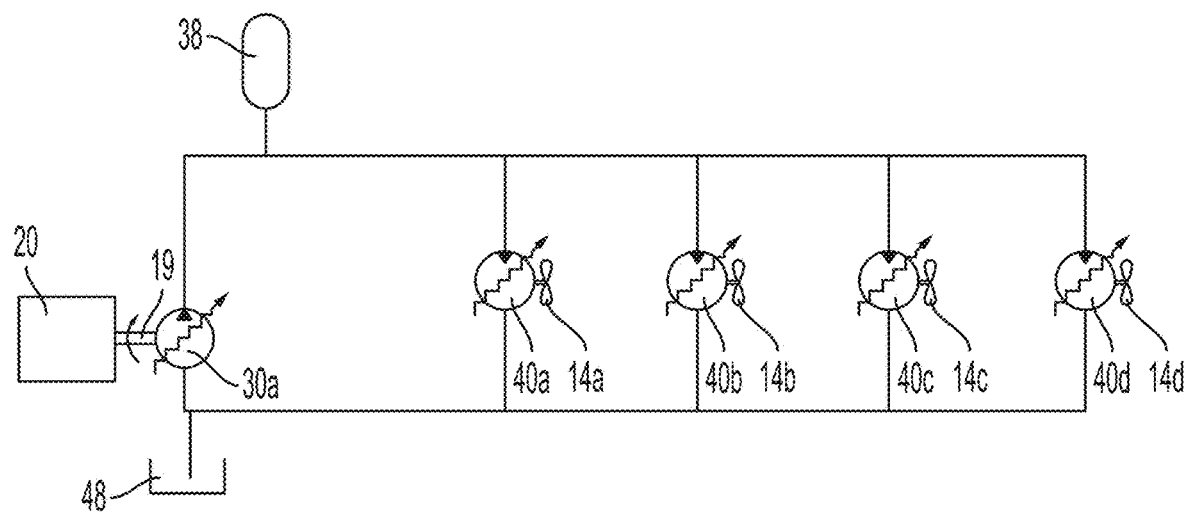
FIG. 3C is similar to 3B, but it comprises only a single output pump service, and common high pressure conduit commoning or combining high pressure connections 22,24, 26,28, which each synthetically commutated motor is connected to. An accumulator 38 is connected to the hydraulic circuit, to a region hydraulically connected to the high pressure conduit, such that a compliant hydraulic system is created, in which the consumption of high pressure fluid from the high pressure fluid conduits, by one or more of the connected motors, will have relatively little impact on the pressure.
Figure 3D:
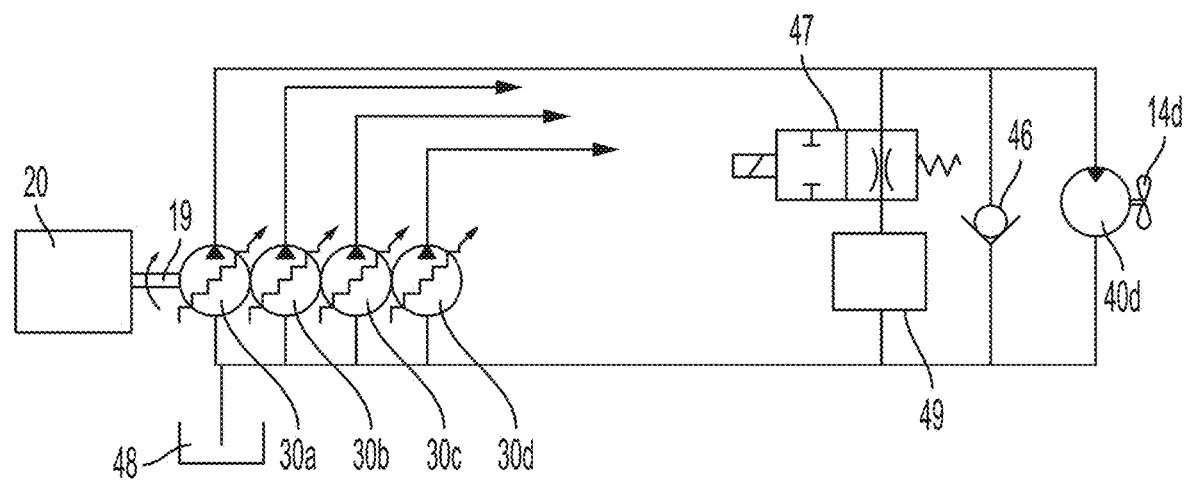
FIG. 3D is similar to 3A with non-synthetically commutated motors powering the rotors, however for clarity it omits the circuit details on three pump connections showing instead truncated hydraulic lines with arrow terminations, and only provides details on the connection for pump 30a, however it is intended that all four connections from the respective pumps adopt the configuration as illustrated in this Figure, thus each pump connection would include check valve 46, a heat exchanger 49 and autorotation valve 47.

FIGS. 3A and 3B illustrate corresponding embodiments in which the motors have low pressure outputs which are commoned and connected to a tank 48. FIGS. 3C and 3D illustrate embodiments in which the motors have low pressure outputs which are commoned and connected to a tank 48.

Electronically Commutated Pump/Motor Structure

Figure 4:
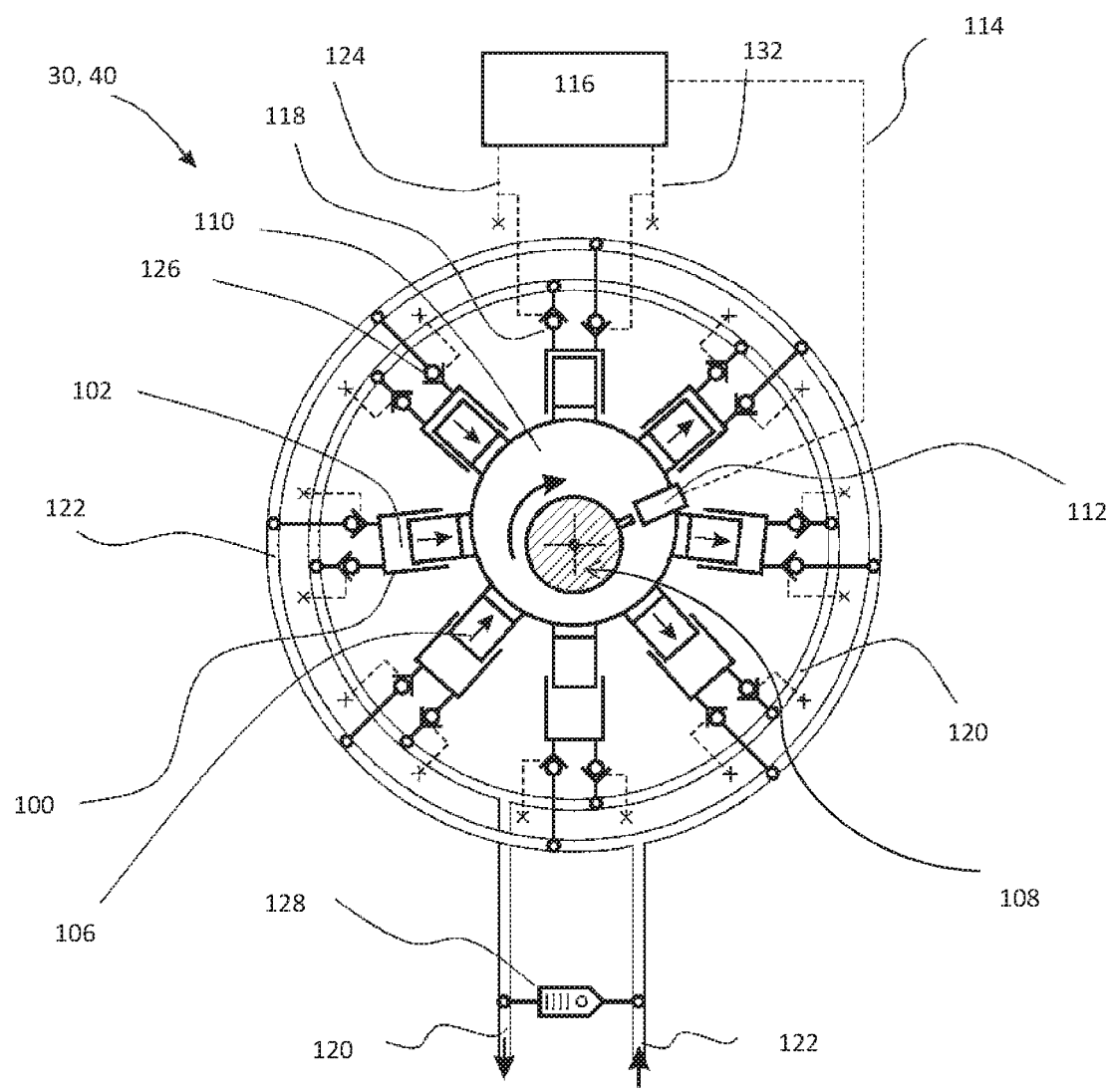
FIG. 4 is a schematic diagram of an individual bank of working chambers functioning as a pump.

FIG. 4 illustrates an electronically (or synthetically) commutated hydraulic machine useful for both the hydraulic pumps 30 and the hydraulic motors 40 of the present invention. Nevertheless, the hydraulic pumps or motors may be simpler in some embodiments, as described further below.

A electronically commutated hydraulic pump/motor comprises a plurality of cylinders 100 which have working volumes 102 defined by the interior surfaces of the cylinders and pistons 106 which are driven from a rotatable shaft 108 (e.g. common shaft 19 in the case of the pumps) by an eccentric cam 110 and which reciprocate within the cylinders to cyclically vary the working volume of the cylinders. The rotatable shaft is firmly connected to and rotates with the generator drive shaft 19. A shaft position and speed sensor 112 determines the instantaneous angular position and speed of rotation of the shaft, and through signal line 114 informs the machine controller 116 of the motor shaft position and/or speed, which enables the machine controller to determine the instantaneous phase of the cycles of each cylinder.

The cylinders are each associated with Low Pressure Valves (LPVs) in the form of electronically actuated face-sealing poppet valves 118, which face inwards toward their associated cylinder and are operable to selectively seal off a channel extending from the cylinder to a low pressure hydraulic fluid line 120, which may connect one or several cylinders, or indeed all as is shown here, to the low pressure hydraulic fluid line 120 of the electronically commutated hydraulic pump/motor. The LPVs are normally open solenoid closed valves which open passively when the pressure within the cylinder is less than or equal to the pressure within the low pressure hydraulic fluid line, i.e. during an intake stroke, to bring the cylinder into fluid communication with the low pressure hydraulic fluid line, but are selectively closable under the active control of the controller via LPV control lines 124 to bring the cylinder out of fluid communication with the low pressure hydraulic fluid line. Alternative electronically controllable valves may be employed, such as normally closed solenoid opened valves.

The cylinders are each further associated with High Pressure Valves (HPVs) 126 in the form of pressure actuated delivery valves. The HPVs open outwards from the cylinders and are operable to seal off a channel extending from the cylinder to a high pressure hydraulic fluid line 122, which may connect one or several cylinders, or indeed all as is shown here, to the transmission high pressure hydraulic fluid line 122. The HPVs function as normally-closed pressure-opening check valves which open passively when the pressure within the cylinder exceeds the pressure within the high pressure hydraulic fluid line. The HPVs also function as normally-closed solenoid opened check valves which the controller may selectively hold open via HPV control lines 132 once that HPV is opened by pressure within the associated cylinder. Typically the HPV is not openable by the controller against pressure in the high pressure hydraulic fluid line. The HPV may additionally be openable under the control of the controller when there is pressure in the high pressure hydraulic fluid line but not in the cylinder, or may be partially openable, for example if the valve is of the type and is operated according to the method disclosed in WO 2008/029073 or WO 2010/029358.

In a normal mode of operation while pumping described in, for example, EP 0 361 927, EP 0 494 236, and EP 1 537 333, the contents of which are hereby incorporated herein by way of this reference, the controller selects the net rate of displacement of fluid to the high pressure hydraulic fluid line by an individual working chamber by either holding the LPV of the working chamber open throughout a cycle of cylinder working volume (in which case there is no net displacement of working fluid to the high pressure line, called an idle cycle) or by actively closing one or more of the LPVs typically near the point of maximum volume in the associated cylinder's cycle, thereby closing the path to the low pressure hydraulic fluid line and directing fluid out through the associated HPV on the subsequent contraction stroke (called a pumping cycle). The net displacement of the pump can be varied by mixing idle and pumping cycles on successive cycles of each of the working chambers in a sequence determined the controller synchronous with the shaft rotation and in response to an electronic demand signal.

Due to the digital nature of such control, and the lack of mechanical friction inherent in changing displacement (which a conventional variable stroke machine would have), this machine does not exhibit hysteresis, deadband, and non-linearity in its response to demand. The machine can change displacement (from max to zero, or vice versa) within half a shaft revolution due to the relatively rapid rotation speed of the machine shaft, the time for half a shaft revolution would typically be of the order of 10 to 20 ms, therefore the machine responds much faster to control inputs than a variable swashplate pump which would typically exhibit delays of more than 100 ms from an electronic demand signal to pump displacement response.

When motoring, the controller selects the net rate of displacement of fluid from the high pressure hydraulic fluid line by a cylinder by either holding the respective LPV open during a cycle (in which case there is no net displacement of working fluid from the high pressure line to the low pressure line) or by actively closing one or more of the LPVs shortly before the point of minimum volume in the associated cylinder's cycle, closing the path to the low pressure hydraulic fluid line which causes the fluid in the cylinder to be compressed by the remainder of the contraction stroke. The associated HPV opens when the pressure across it equalises and a small amount of fluid is directed out through the associated HPV. The motor controller then actively holds open the associated HPV, typically until near the maximum volume in the associated cylinder's cycle, admitting fluid from the high pressure hydraulic fluid line and applying a torque to the rotatable shaft. This leads to a motoring cycle. The controller selects the number and sequence of LPV closures and HPV openings to produce a flow or create a shaft torque or power to satisfy a selected net rate of displacement.

As well as determining whether or not to close or hold open the LPVs on a cycle by cycle basis, the controller is operable to vary the precise phasing of the closure of the either or both the HPVs and the LPVs with respect to the varying cylinder volume and thereby to select the net rate of displacement of fluid from the high pressure to the low pressure hydraulic fluid line or vice versa.

Arrows on the ports 122, 120 indicate fluid flow in the motoring mode; in the pumping mode the flow is reversed. A pressure relief valve 128 may protect the hydraulic motor from damage.

Although the machine shown in FIG. 4 is usable as either a pump or a motor, in some embodiments, the pumps 30a, 30b, 30c, 30d which are driven by the prime mover do not have electronically controlled high pressure valves. Instead, the high pressure valves are passive check valves, and thus the pumps 30a, 30b, 30c, 30d cannot perform a motor function.

Similarly, in some embodiments, the hydraulic motors use entirely passive valves, or commutating port plates, in which case they are less controllable and may be regulated simply by the pressure of received hydraulic fluid.

Control of Vehicle

It can be seen that the common shaft 19, extending out from the prime mover 20 drives four pumps 30a, 30b, 30c, 30d. Each pump 30a, 30b, 30c, 30d drives a respective hydraulic motor 40a, 40b, 40c, 40d. Each hydraulic motor drives a respective rotor. Thus, the controller can independently control the rotation of each of the four rotors, by independently regulating the amount of working fluid displaced (per revolution of the common shaft) by the individual pumps, by controlling the electronically controlled valves of the respective pumps.

Figure 5:
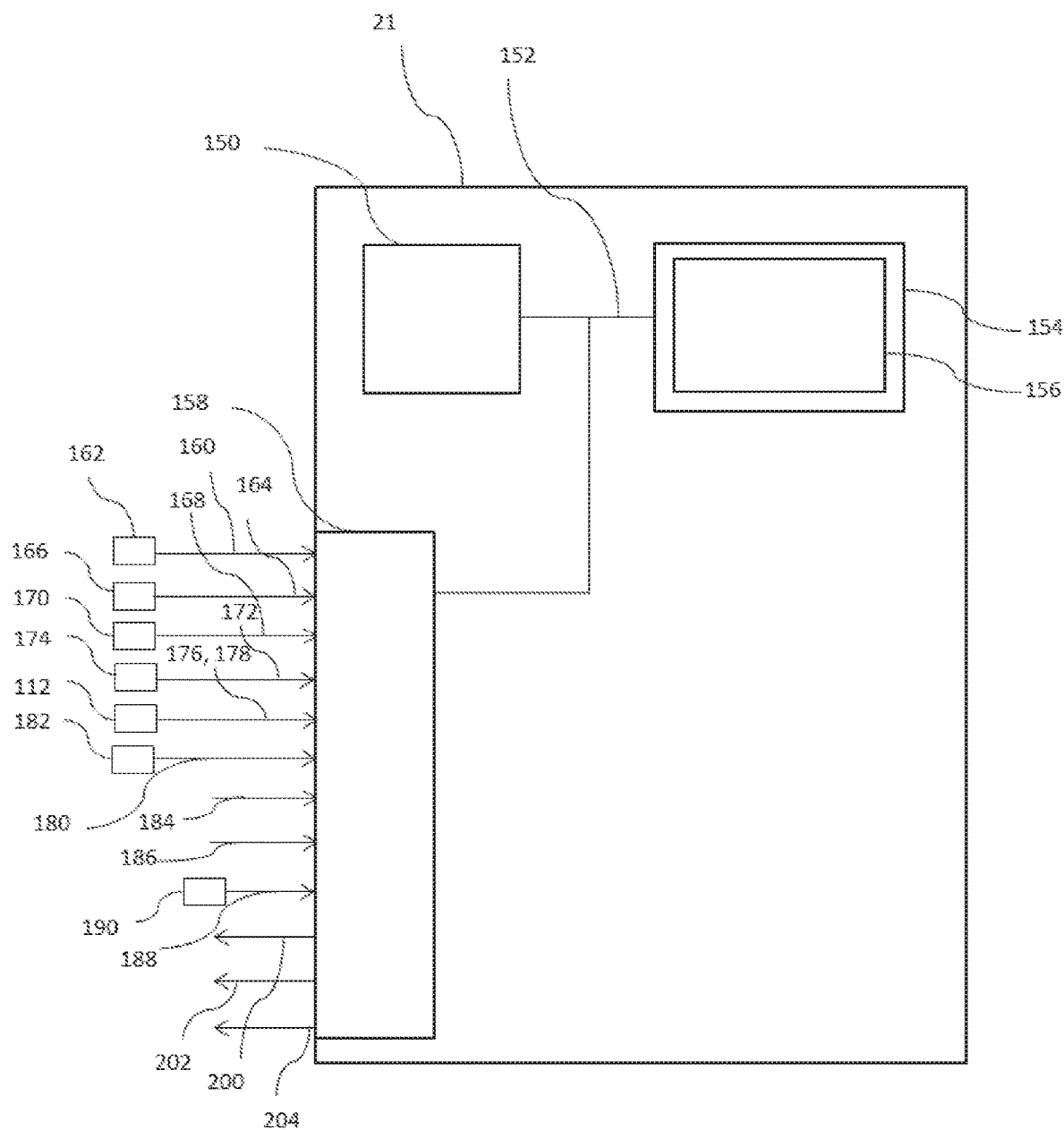
FIG. 5 is a schematic diagram of control functions.

With reference to FIG. 5, the controller 21 comprises a processor 150 in electronic communication through a bus 152 with memory 154 storing an operating program 156. An electronic interface 158 receives inputs including:

The speed of rotation 160 of each rotor, measured by 4 speed sensors 162

Rotation speed measurements 164 from a 3-axis gyroscope 166

Acceleration measurements 168 from a 3-axis accelerometer 170

Magnetic field strength measurements 172 from a magnetometer 174

The speed of rotation and/or position 176/178 of, the rotatable shaft 19 from the speed and position sensor 112

Longitude, latitude and altitude data 180 from a global navigation satellite system receiver 182 (e.g. GPS receiver)

The current power output 184 of the prime mover

The current spare battery capacity 186 of the batteries

The level of fuel in the fuel tank

The temperature of the hydraulic oil

The level of the hydraulic oil in the oil tank

The temperature and/or other status signals of the engine

Control instructions 188 from a remote controller (e.g. a server) received through a wireless communications interface 190 (e.g. WiFi or a cellular network data interface)

Ranging data such as ultrasonic, radar or LIDAR (Light Detection and Ranging) to which provide height above ground or to scan for obstacles.

Processed camera signals indicating ground speed such as from an optical flow sensor The electronic interface 158 transmits outputs including:

Valve control signals 200 to control the electronic valves within the pumps (and in some embodiments the motors)

Prime mover control signals 202 (e.g. instructions to accelerate, decelerate, target torque, power output etc.)

Reporting data 204 for a remote controller (e.g. current position, orientation etc.)

Instead of valve controls signals 200, the electronic interface may output control signals (e.g. target displacement or pressure signals) which are processed by separate circuitry to determine the timing of active control (e.g. opening, closing, holding open, holding closed) of electronically controlled valves. One skilled in the art will appreciate that whether the function of the controller is implemented in a single integrated circuit or distributed amongst a plurality of discrete circuits is a matter of design choice.

One skilled in the art will appreciate that the functionality of the controller may be distributed amongst a plurality of processors or circuits. Some of the functionality of the controller may be implemented in processors or circuits of the electronically commutated pumps (and electronically commutated motors, where present). For example, a central processor may output a target (e.g. as to rate of displacement, or torque, or output pressure) to a pump or motor controller, such as machine controller 116, which generates the valve control signals required, taking into account the rotating shaft position/speed signals, so that the target is met.

The controller receives a desired location (e.g. longitude, latitude, altitude) and configuration (e.g. hovering, picking up or dropping off a parcel) or flight path (expressed as a series of intermediate coordinates or path segments) of the multirotor and controls the speed of rotation of the rotors to move the device to that location or along that path as is generally known in the field of aerial drones and multicopters. The controller may also autonomously decide its desired trajectory in response to sensor inputs, for instance to seek a person who is lost at sea using a thermal camera input.

For example, in order to gain height, the speed of rotation of upward facing rotors can be increased until the lift generated exceeds gravity, or reduced in order to lose height. Feedback from the abovementioned sensors, notably the rotor speed sensors, GNSS (Global Navigation Satellite System) position data, accelerometer data (which is processed to determine the direction of gravity and therefore orientation in addition to measuring further components of acceleration), magnetometer and gyroscope data, is monitored continuously in order to assist control. Rotors on one side of the device may be controlled to generate different lift to rotors on the other side to tilt the device. Rotors turning clockwise may be sped up, while rotors turning anti-clockwise are slowed down, or vice versa, in order to generate a yaw moment. Rotors facing with a horizontal component can be driven to generate horizontal movement. Suitable rotor control methods are known to those skilled in the art of multirotor control.

The control loop of the multirotor would comprise multiple nested control loops, with each loop providing commands the next inner loop. The innermost control loop of the multirotor would seek to attain a commanded attitude rate (i.e. rate of change of pitch, roll and yaw) with reference to gyroscope signals, by setting each rotor commanded thrust. The next outer loop would seek to attain a commanded attitude (i.e. pitch, roll and yaw), with reference, to gyroscope, compass and accelerometer signals, by providing attitude rate command signals to the innermost loop. The next outer loop would seek to attain a commanded translational velocity of the multirotor with reference to GPS (Global Positioning System) signals and/or integrated accelerometer signals, by providing attitude command signals to the attitude loop. The next outer loop would seek to attain a commanded position with reference to GPS signals or distance sensors.

For control of multirotor altitude, a signal from a barometer, GPS or a non-contact height sensor (for instance ultrasonic, LIDAR or radar) would be compared to a commanded height to give an altitude error. This height error would be fed through a PID (proportional-integral-derivative) control loop to determine the commanded altitude rate such that the multirotor seeks to attain the commanded altitude. The commanded altitude rate would be compared with the observed altitude rate from differentiated barometer, GPS or non-contact height sensor, or integrated acceleration sensors, to give an altitude rate error. This altitude rate error would be fed through a PID controller to give an altitude rate acceleration command, which would be compared with the observed altitude rate acceleration (typically from accelerometer signals) to give an altitude rate acceleration error. This error would be fed through a final PID controller to give an overall rotor thrust command, which would be mixed with the individual rotor thrust commands from the attitude rate controller to determine the final rotor speed commands.

It may be advantageous to fuse signals from multiple sensors to reduce error and provide best combination of high frequency information of one sensor (e.g. from an accelerometer), with low drift and absolute accuracy of another (e.g. non-contact altitude sensor). Such sensor fusion may be done by so-called complementary filters, or a Kalman filter.

According to the invention, the electronically commutated pumps allow the rate of displacement to individual motors (and therefore the speed of individual rotors) to be varied at high bandwidth, and with high efficiency. The controller determines an appropriate shaft speed for the prime mover taking into account the flow limits of each electronically commutated pump service, overall power demand and the variation in the power efficiency of the prime mover with shaft rotation speed. Each pump may have a single service or multiple services. Grouping of services, or outputs from each cylinder, is discussed below. The controller receives rotor speed signals from each rotor and so can control the respective pump valves to vary displacement using open-loop flow control, closed-loop speed control, or a combination thereof.

In embodiments using electronically commutated motors (FIGS. 2B, 3B, 3C) further control is possible in that the volume of hydraulic fluid which is displaced per rotation of the rotatable shaft of the motor (and attached rotor) can be varied continuously, allowing the torque which is applied to the rotor (which is proportional to the product of the differential fluid pressure and the motor's displacement of working fluid per revolution) to be independently varied from the pressure by varying the motor's displacement of working fluid per revolution. This can further increase the control bandwidth, while also allowing a compliant element such as an accumulator to be connected to each of the high pressure lines, providing a short-term storage of energy to allow transient demands to be reacted to without requiring the pump or prime mover to react to quickly.

It may be required for a hydraulic motor to act as a pump in a transient condition, so as to quickly decelerate the rotor. For instance, in case of a sudden pitch forward command, the forward rotors may be commanded to decelerate by applying a negative torque (requiring the respective motors to act as pumps), while the rear rotors may be commanded to accelerate, applying a positive torque (requiring the respective motors to act as motors). It is preferable that the fluid energy generated by the motors for the forward rotors (acting as pumps) is not wasted, but is instead recirculated to supply the additional energy required by the rear rotors to accelerate.

To this end, high pressure lines may be commoned amongst (i.e. in fluidic communication with) multiple electronically commutated motors. This has the benefit of allowing fluid energy to be recirculated from one motor (acting as a pump) to another motor.

Because the pumps route fluid directly to individual hydraulic motors, and because the pumps are electronically controlled, with displacement decisions being made for each cycle of working chamber volume, the torque applied to each rotor can be varied very quickly. For example, if the common shaft rotates at 1000 rpm and each pump comprises a bank of 6 cylinders (for example) distributed around the shaft, it is possible to make a decision whether a cylinder makes an active cycle with a net displacement of hydraulic fluid, or an inactive cycle every 10 ms, and therefore to rapidly vary the net displacement to each rotor. Accordingly, a time varying net displacement target can be accurately met by making decisions as to whether each consecutive cylinder should carry out an active or inactive cycle (and in some embodiments, for active cycles, what the net displacement of that cycle should be) depending whether the sum of displacements during preceding cycles is slightly below or above the integral of the net displacement target during a corresponding period of time.

Surprisingly, the inventors have found that open loop control by enabling and disabling individual pump working chambers on a stroke-by-stroke basis by means of solenoid valves using a sigma delta algorithm can be used to make this very accurate without hysteresis or non-linearity. Thus, accurate control of vehicle speed, attitude and position can all be achieved. In contrast to the prior art, in which the flow is controlled by a proportional valve, or by a variable displacement pump with a stroke varying mechanism actuated under control of a proportional valve, the displacement of the electronically commutated pump does not have a tendency to remain at the current valve due to friction, inertia, and damping effects. This means for instance that in response to a small variation in prime mover speed, the pumps of the present invention may be adjusted accurately and almost instantly to slightly reduce their displacement to counteract the speed variation, and hence to keep constant the flow provided to each motor regardless of prime mover speed variations. It also means that in response to small variations of the rotor speed command signal from the flight controller, the pumps of the present invention will accurately and almost instantly follow the command. This results in improved attitude, and hence positional control, compared to the prior art.

In the embodiments of FIGS. 2B, 3B and 3C, the motors are also electronically controlled hydraulic machines in which the displacement of each working chamber is controlled on each cycle of working chamber volume by the active control of electronic valves, allowing independent control of torque and speed of rotation. In such embodiments it may be desirable to have a compliant hydraulic system (through use of an accumulator, connected to the fluid ports/fluid connections between the shaft driven hydraulic machine, and the rotor driving hydraulic machine), such that the hydraulic volume between the pump and motors comprises an accumulator (or merely the hoses etc, or some other compliance providing component, can swell to have an accumulator like-effect) and this can be used as a significant energy store. If the flight controller demands an increase in rotor speed, this is met by commanding the respective motor to increase in speed, and will correspondingly increase the displacement command, whereby the pressure in the fluid conduits will drop. In a compliant system, removing volume has a relatively small effect on the pressure, and thus drawing fluid by the motor(s) in order to increase speed, will have a small effect on the pressure.

Depending on how long the elevated motor demand is sustained, it may be necessary to increase the output from the pump. Alternatively, if the increased motor demand is very short term, no addition level of input to the system is required by the pump.

In the embodiments of FIGS. 2A and 3A, the motors are fixed displacement hydraulic machines. It may be desirable to use these rotor motors which themselves have a low bandwidth control characteristic, with a pump having a high bandwidth response characteristic, and for them to be connected by a hydraulically stiff system. This means the hydraulic volume between the pump and motors does not comprise an accumulator (or compliance providing component/structure) and thus there is relatively little energy stored within this volume. If the flight controller demands an increase in rotor speed, this is met by commanding the respective pump to increase pressure. As the pump has high bandwidth control, and is coupled to the stiff system, an increase in pressure output by the pump is very rapidly seen at the inlet of the motor, and thus the motor will increase in speed rapidly.

Furthermore, the use of a single shaft driving the various pumps, enables the prime mover to be operated efficiently. The high control frequency of each pump allows the rate of displacement of hydraulic fluid to the motors driving each rotor to be changed rapidly (e.g. to begin an ascent or descent of the multirotor) despite the inertia of the prime mover and rotatable shaft (and connected rotating and reciprocating masses).

The controller is programmed to determine the total torque of the pumps and the torque of the prime mover and to balance and manage these. The torque of an individual pump is calculated as the product of the displacement of working fluid per revolution by the individual pump and the pressure of the output fluid. Thus, the total torque acting on or provided by the common shaft can be obtained by summing the torque for each pump. The prime mover receives this total torque, and so by regulating the rate of displacement of working fluid by each pump, and the pressure of the hydraulic fluid at the outputs of each pump, a maximum prime mover torque, or a target prime mover torque (e.g. selected for reasons of efficiency) may be implemented. In embodiments in which the hydraulic motors are electronically commutated machines, the pressure in the hydraulic connections between the respective pump and the respective motor, and therefore at the output of each pump, can also be controlled by regulating the rate of displacement of the respective hydraulic motor. A total pump torque limit may be implemented by the controller. The total torque of the pumps may be restricted at times in order to enable the speed of rotation of the prime mover to increase where required.

The controller may implement one or more priority rules when controlling the rate of displacement of hydraulic fluid by individual pumps. It may be that the controller comprises a flight control module which determines the intended path of flight of the vehicle. It may be that if a torque indicated by a motion request, e.g. a torque required for the vehicle to follow the intended path of flight, cannot be implemented, because the required rotor torque cannot be obtained from the torque available from the prime mover, the torque generated by each pump is scaled back proportionately so that the total torque by each pump meets a torque limit.

The demanded torque from a flight control system can be distributed to each pump service according to priority. For instance, in case the flight control system demands flows from the pump services which mean that the total engine torque limit would be exceeded, the torque imposed by the piston cylinders of each service may be scaled proportionally until the total torque, summed from the piston cylinders of the respective services, matches the available prime mover torque.

In the case of a quadcopter, if a first motor driving a first rotor was torque limited, but a cooperating second motor which operates in counter-rotation was not, then an undesired yaw could result due to a net yaw moment being generated. Hence the torque generated by motors which drive rotors which are opposition each other may be scaled in proportion to each other such that no yaw moment is generated during periods of torque limiting.

It is important that small signal corrections from the flight control system for attitude control are passed through the control system without distortion. Take for example the case where the vehicle is ascending and the prime mover torque limit is reached, while at the same time a small incremental signal is generated by the flight control system to increase the thrust of one rotor to correct the attitude following a gust of wind (gust caused by weather, or some other e.g. local disturbance). In such circumstances, in a stability priority mode, the increase in the thrust of one rotor (e.g. for correction purposes) will result in the reduction of thrust from the other rotors (due perhaps to reduction in displacement of those respective motors, or reduction in displacement of the respective connected pumps), such that the total prime mover maximum deliverable torque is respected. This will result in a momentary reduction of the rate of ascent during the period of correction following the gust (or if it was previously near/at maximum, then it might cause the air vehicle to slightly descend).

As well as yaw moment, the inertia of fluid may generate further forces which perturb vehicle stability. Although the mass of the fluid within hydraulic connections is relatively low, the velocity may reach perhaps 14 or even 20 meters per second. The acceleration of masses of fluid in conduits may lead to forces on the vehicle.

Fluid conduit routing may need to take into account the potential to generate forces by accelerating fluid, and it may be preferable to direct conduits in a radial nature from a central pump or pumps, and to minimise conduits which encourage flow in a circular direction (which may produce rotational forces on the vehicle). It is likely that forces which act radially have a lower impact on the vehicle control compared to unwanted forces acting in a yaw type direction. In summary, radial straight conduits may be preferred over circular routed conduits, or conduits which encourage flow in a circular direction.

Such fluid inertial related forces may impact on control of the vehicle, and it may be necessary to anticipate and even compensate for such forces, for example within the control strategy of the vehicle.

To increase redundancy, the mechanical input to a rotor (e.g. rotor shaft, or a gear) may be directly or indirectly connected to the mechanical output of a plurality of hydraulic motors 40 (rather than just a single rotor), which are thereby multiply redundant. Some or all of the motors may be provided by redundant pumps which are instead run in a motor mode.

In some embodiments, to increase the speed of control response, the rotors can be actively decelerated by the hydraulic drive. One option is to use an overcentre valve 45, shown in FIGS. 3A and 3B. When the pump flow reduces below the flow taken by the rotor drive motor, the hydraulic line pressure at the motor reduces, causing the overcentre valve to throttle the output flow from the motors, decelerating the rotor rapidly until it matches the flow produced by the electronically commutated pumps. Check valves 46 allow the motors to intake from the tank in this situation thus avoiding cavitation.

A number of features can be provided in order to minimise the weight of the hydraulic components. For example, lightweight materials can be used to form the fluid conduits (pipes, hoses, galleries etc.). Hydraulic hoses typically comprise an inner tube, a surrounding reinforced layer (polyester yarn/Kevlar layer/wire reinforcement/other strong fibre), and an outer casing for abrasion resistance and flexibility. Instead of being reinforced equally along the length of hoses, hoses may be selectively reinforced along only parts of their length and/or around parts of their circumference, thereby reducing the total mass of reinforced material present. Furthermore, the outer casing could be selectively reduced or increased along its length and/or around its circumference, to reduce the total mass of reinforced material present. In effect, hose reinforcement and casing can be reduced overall, and present only on sections of hose where they are needed (where there is abrasion, stress, wear likely, protection essential etc.). The reduction may extend to the absence of reinforcing material, e.g. on zones of the hose which do not need to flex or which are unlikely to contact other parts, thus negating the requirement for the outer casing. The reinforced layer may comprise or consist of silk, carbon nanotubes, graphene, or a combination or composite including one or more of these.

The structure of the vehicle itself may be used to transfer hydraulic fluid, and thus fluid connections may be integral to the structure. In the example illustrated in FIG. 1, the pump is mounted in the central core 12, from which arms extend radially to support and mount the rotors and their respective motors. The arms longitudinal nature may include a drilling or void formed by some other means, along the length of the arms to thereby transfer fluid to the motor. Thus, the fluid connections between the pumps and the motor may extend through bores in the body (e.g. chassis) of the multi-rotor aerial vehicle.

Weight can also be reduced by minimising the volume of an internal crankcase/tank (where low pressure hydraulic fluid is retained prior to being pumps and after driving the motors), for example by filling unnecessary volume with filler material and/or hollow voids.

The hydraulic system may be adapted to be tolerant of high acceleration forces, and possible inversion (both during operational, and non-operational period). For example, in an open hydraulic system, breathing ports (to atmosphere) must not be susceptible to ejecting hydraulic fluid rather than air. For example, there may be breathing ports to the surrounding air (e.g. between the tank 48 and air, or between shared lower pressure line 32 and atmosphere) and controllable valves (typically electronically controlled valves, e.g. under the control of the controller) which are controllable to block the egress of hydraulic fluid out of specific ports (for example when the controller determines that the device is at a range of orientations, e.g. upside down). The controllable valve may be normally closed (e.g. biased to the closed position) so that they block the egress of hydraulic fluid when unpowered. The hydraulic tank may be pressurised by a diaphragm or bladder containing compressed air, such that positive pressure is maintained on the inlet of the pumps regardless of the aircraft attitude. The hydraulic tank may also contain baffles to inhibit sloshing of the oil during maneuvers.

The multi-rotor aerial vehicle may comprise additional and/or reinforced structures between high pressure fluid components (particularly high pressure fluid connections 24) and a region where cargo is located (e.g. an internal compartment, a cargo bay, a seat). This is especially important where the cargo is biological, for example a human passenger. Structures may be provided between the passenger and potential high pressure leak zones or higher risk high pressure leak zones. The high pressure components, such as the high pressure fluid connections) may be configured such that some existing part of the vehicle (e.g. generally radially extending arms) is between the potential leak point and the passenger or other payload. E.g. a multi-rotor aerial vehicle might be configured to carry a passenger on the top, e.g. above the multicopter structural arms, with the high pressure components (e.g. high pressure fluid connections) being located below or in the lower part of these arms (thus the arms obscure potential jets of fluid directly to the passenger/operator). As mentioned above, the fluid connections might be located within the structure of the vehicle, including within the generally radially extending arms, to thereby contain potential fluid leaks, and to aid reduction of the coefficient of drag.

It may be that some or all of the motors are partially compassed within the body of the multi-rotor aerial vehicle, being at least partially surrounded by material (e.g. shrouded). The multi-rotor aerial vehicle body may comprise a ring cam drive arrangement. The cam may be on the stator stationary side and piston/cylinder arrangements rotate relative to and act against the stationary cam. Or, or the cam is on the rotor rotating side, and the piston/cylinder elements do not rotate relative to the body of the vehicle. In this latter rotating cam embodiment, the respective vehicle rotor may have an annular ring at its periphery, which comprises one part of the ring cam drive arrangement, and thus the rotor ring is part of or is rotatably connected to the respective hydraulic motor (the cam), and thus is directly driven by the pistons and cylinders of the motor.

In the event that the surrounding structure radial extent was limited, it might be desirable to omit and/or non-symmetrically distribute some piston-cylinder devices with rollers driving the cam, and thus there may be an unequal circumferential distribution of the cylinders (and pistons) around the periphery of the rotor. The cylinders might be positioned in regions of greater space and omitted from the other regions where space is limited, or where it is desirable to locate the mass of the cylinder more to one side of the rotor than the other (e.g. clustering towards the centre of the vehicle). In the event of unacceptable bearing load (having only a few piston-cylinder units located purely on one side of the rotor, then the cam could be double sided, and opposing piston cylinder units run on each cam surface, and the pairs of opposing piston cylinder units operated such that the bearing load of one of the pair offsets the bearing load of the other of the pair, resulting in near zero radial load on the rotor.

Further Example Embodiments

1. In some embodiments, to prevent fuel/oil/cooling water starvation problems caused by inversion, the prime mover and the pumps may be mounted on a gimballed subframe such that the prime mover is always hanging downwards in spite of tilting of the multicopter.

2. The multicopter may transform from a multicopter in the hover format (where thrust from the rotors solely keeps the multicopter aloft) to an aeroplane format, whereby forward motion generates lift on an aerofoil either instead of, or additional to, the thrust from downwards-pointing rotors. This may be done by keeping the constant X-shape platform shown in FIG. 1 and tilting forwards such that the rotors provide forwards thrust, while all the arms of the structure provide lift due to their aerofoil section, or by only two of the legs being horizontal and providing lift, while the two being vertical do not provide lift. The axis of some of the rotors may tilt (like in the MV-22 Osprey) to transition from hover to forward flight. The actuators for such tilt may derive flow from the pump.

The electronically commutated pump will provide high pressure fluid to rotors which are orientable between a first orientation which provides upward thrust on the vehicle, and a second orientation which provides forward thrust on the vehicle. The pump may also supply fluid to fixed orientation rotor or rotors which provide forward thrust on the vehicle. The reorientation action is also referred to as tilt, or tilting.

The tilt action may require redirection of fluid via diverter valves, for example where fluid energy is primarily expended in the motor(s) of the vertical axis rotor(s) and then after the tilt the fluid energy is primarily expended in the motor(s) of the horizontal axis rotor(s).

The actuators required for the above discussed tiling actions, may be hydraulically actuated, and may be fed by and share the main hydraulic system. There may be a bleed-off from that system to supply the actuators, or there may be a dedicated service on the pump. Other actuated components which may utilise the same actuation feed or circuit, include landing gear actuators. Sharing the main hydraulic system means that some sharing and or reallocation of piston/cylinder units may be required depending on what the pressure and flow requirements are of each hydraulic component, and the nature of the service connections.

3. Hydraulic motors sometimes have a preferred direction of rotation. In some embodiments, some (typically half) of the rotors are driven to rotate in the opposite direction, so that their torques counteract when the multicopter is in a 'hover' state. To reduce inventory and enhance re-use of spares, it is desirable to use identical motors on each rotor. Thus the motors may rotate in the same sense as each other but the rotors which they drive may rotate partially (e.g. half) in one sense and the others (e.g. half) in the other sense. This may be realised by pointing some of the motor shafts upwards (towards the sky) in use, and the others downwards (towards the ground) in use, or by using meshed gears on half of the rotors so that half rotate in the opposite direction to the motor shafts.

4. The controller may be configured (e.g. programmed) to vary the prime mover speed to provide just enough power for hovering, typically plus a predetermined margin; and to then increase (e.g. temporarily) whenever higher power is required (or is forecast to be required) for acceleration, climbing or maneuvering. i.e. there may be a default prime mover speed or power output (e.g. in a hover mode), from which the prime mover speed or power output is temporarily varied before returning to the default prime mover speed.

5. The hydraulic motors which drive the rotors will typically contain bearings to locate the motor shaft. It may be preferable that the rotor is directly mounted on the hydraulic motor shaft, such that the thrust of the rotor is reacted against the motor bearings. In case of an axial piston motor, or bent-axis motor, the thrust bearing on the motor shaft may have a reduced rating when load is applied to pull the shaft out of the motor, compared to an increased rating when load is applied to push the shaft into the motors, the latter being preferred for best lifetime and reduced risk of failure. Therefore the motors may be mounted to the frame above the rotors.

Alternatively the rotor thrust may be reacted against the frame by separate bearings to those of the motor. The motor may then deliver a pure torque to the rotors by means of a spline or other coupling which is axially free but torsionally stiff.

6. Conventional helicopters offer a safe mode of descent in the emergency case that the prime mover fails, in which the rotor is driven by the air flow, acting to limit the rate of descent (autorotation). Control of descent rate is exerted by the pilot during autorotation, by adjusting the pitch angle of the rotor blades.

In the case of a multirotor using fixed displacement hydraulic motors to drive the rotors, there is no control of pitch angle because the rotor blades have a fixed pitch. Therefore, when motive power is lost and the rotors are driven by the air in descent, the motors will be turned by the rotors in the opposite direction to the normal direction, and hydraulic oil will be pumped by the motors from the low pressure port to the high pressure port. This oil will accumulate in the high pressure line until the pressure relief valve pressure is reached. This will retard the rotation of the rotor such that it stalls, and the rotor will fall through the air without rotation, therefore failing to significantly retard the descent of the aircraft, and an uncontrolled crash will result. To prevent this, and to provide a method of stabilisation of the aircraft during such emergencies, a proportional valve 47 shown in FIG. 3D, may be fitted to each motor high pressure line, which allows oil to be throttled between the high pressure line of each motor and low pressure (e.g. back to the tank). By adjusting the size of the throttling orifice taking flow from each motor such that a steady state is reached, the multirotor may descend at a steady rate, the potential energy thus absorbed as heat in the oil. The flight controller may continue to stabilise the attitude of the aircraft, and may retain some control of its trajectory, by sending its commands to each of these proportional valves, instead of to the pumps. Similar differential rotor control methods to normal operation may be used to stabilise the attitude. For instance, in the case of an X-form quadcopter, to create a yaw moment, the two rotors turning clockwise may be throttled more than the two rotors turning anticlockwise. To create a pitch moment, the two forward rotors may be throttled more than the two rear motors. To create a roll moment, the two forward rotors may be throttled more than the two rear motors.

As has been noted, due to the shortcomings of proportional valves, the control quality will not be as good as in the normal driven mode, but may be sufficient to make a controlled landing rather than a catastrophic crash.

In the case of a multirotor using electronically commutated motors to drive the rotors, the proportional valve may be replaced with a digital (on/off) solenoid autorotation valve 47, as shown in FIG. 3D (however, this image shows a fixed displacement hydraulic motor), containing a preset orifice which connects the high pressure line with low pressure when the autorotation is initiated. Variations of the selected valve may be possible, as is clear to one skilled in the art, however as illustrated the valve would in the event of power failure, fail to a position in which the throttle connects the high pressure line of each motor to the low pressure line. Control of attitude and descent rate in this case may be done by modulating the displacement of the motors under command of the flight controller such that the motors act as pumps, pumping oil across the solenoid valve orifice, producing the torque, and therefore retarding force, demanded by the flight controller. Differential torque applied to each rotor will produce attitude corrections as noted above.

In case of a descent by autorotation as above, heat is quickly generated in the hydraulic circuit and therefore it is advantageous if the return flow from the throttle valve is directed into the main tank such that thermal mixing may occur. A heat exchanger 49, as shown in FIG. 3D, may be required to remove heat from the oil in this mode.

As a final safety measure, in case that a failure mode occurs which prevents a safe descent by means of autorotation (for instance, complete loss of hydraulic fluid or a failure of the flight controller), then a parachute may be deployed, for instance by rocket, such that the aircraft can descend at a controlled rate without any control inputs. This final parachute deployment may be trigged by an independent controller to the primary flight controller, over which it acts as a watch-dog. Such independent controller may also take other action to ensure safety, such as to jettison the load or fuel, to disable the pump(s), disable the engine, close fuel cutoff valves and otherwise make the aircraft descent as safe as possible.

In some embodiments, some or all of the pumps are pump-motors, i.e. they have electronically controlled high pressure valves and are controllable to pump or motor in alternative operating modes as described above with reference to FIG. 4. At least one of these pump-motors may be connected to an accumulator. Thus, the pump-motor(s) connected to an accumulator can by operated in a pumping mode to store pressurised fluid in the accumulator and then later motored, driven by pressurised fluid from the accumulator, to provide transient additional power, to supplement the power output by the prime mover. This transient additional power may be useful for dealing with transient wind effects (e.g. sudden gusts of wind), or bursts of higher acceleration, more quickly than can be provided by changing the prime mover speed. In some embodiments, the transient power supplied by motoring driven by the accumulator(s) is used to temporarily provide increased power while the prime mover speed is increased. This is especially helpful when lifting heavy payloads, i.e. those close to the maximum weight which is carriable by the multi-rotor aerial vehicle.

In some embodiments the controller may selectively carry out a procedure in which the rate of displacement of working fluid of one or more of the pumps is temporarily restricted, typically such that the rate of displacement of working fluid to the respective motor(s) drops below the amount required for the multi-rotor aerial vehicle to continue to hover, typically causing the multi-rotor aerial vehicle to lose altitude, while the prime mover speed (and therefore the speed of rotation of the rotatable shaft of the pump(s)) increases. The rate of displacement of working fluid is then increased again once the prime mover speed has reached a target speed (which is higher than the original prime mover speed). Effectively, the load on the prime mover is temporarily reduced by restricting the rate of displacement of working fluid by one or more of the pumps driven by the prime mover while the speed of rotation of the output shaft of the prime mover increases, and then the torque is increased again, by increasing the rate of displacement at a higher speed of rotation, thereby providing a higher power than before. This then allows the vehicle to hover again, or climb, now that more power is available.

In embodiments where the motors are electronically commutated motors, changes in motor torque may be implemented more quickly because the torque of the motors may be varied without waiting for the pressure in the hydraulic connection from the respective pump to increase.

It may be that at least two, or all of the motors, are fluidically connected to the output of an individual pump, or the combined outputs of more than one pump, but the electronically controlled valves of the said motors, are controlled to independently vary the displacement of the at least two, or all of the motors. Thus, a part of the hydraulic circuit connecting the output of the one or more pumps to the input of the at least two, or all of the motors may have a common pressure, with the torque generated by each of the motors independently controlled by the controller. There may be an accumulator in communication with the said part of the hydraulic circuit (to stabilise the pressure in the said part of the hydraulic circuit).

6. The rate of displacement from individual pumps may be controlled to produce a set flow-rate (compensating for the actual prime mover speed of rotation), to thereby control the thrust generated by the respective rotors. It may be that the individual motors are fixed displacement (per rotation of the rotatable shaft of the motor), and these fixed displacement motors will turn at a speed which is proportional to the rate of fluid flow to the respective motor, from the respective pump; both the motor torque and rotor thrust will be proportional to the square of that motor speed (the torque and thrust of a rotor being proportional to the square of the speed). The controller may query stored conversion data (e.g. a look-up table) which relates a target thrust (or a variable related to thrust) to pump flow-rate, and controls the flow rate of the respective pump accordingly. In case of a sudden step demand of torque, the rate of displacement by the respective pump will suddenly increase while the rotor inertia means that the rate of displacement by the respective motor will increase more slowly—this difference accumulates in the hydraulic connector between the respective pump and motor which will cause the pressure to spike; this pressure spike then causes the rotor to quickly accelerate to the new speed.

7. Alternatively, to control the thrust of a respective rotor, the rate of displacement of hydraulic fluid by the respective rotor may be controlled using closed-loop feedback to maintain a target pressure. This target pressure will be proportional to the target rotor torque and hence the thrust. The pressure may be controlled using feedback from a pressure transducer which measures the pressure of hydraulic fluid output by the respective pump (either at the pump or in the hydraulic connector extending to the respective hydraulic motor), and a pressure-control feedback algorithm implemented by the controller. This method of control results in a slower but more stable response to changes in target thrust, because only the steady-state pressure is made by the pump; only the difference between the current pressure and the newly-desired pressure is available to accelerate the inertia of the rotor; and there is no sudden pressure spike.

8. Alternatively, to control the thrust of a respective rotor, the rate of displacement of hydraulic fluid by the respective pump may be controlled using closed-loop feedback to obtain a target rotor speed, using a rotor speed transducer. In case of a transient demand increase, the rate of displacement per rotation of the rotatable shaft of the respective pump may make a step change to a high (e.g. maximum) rate, such that the system pressure rapidly increases (e.g. to a predetermined maximum, for example until pressure limiting control acts to prevent over-pressure); then the rate of displacement by the pump returns to the desired steady-state value once the desired rotor speed is reached. Thus the acceleration to the new thrust condition happens as quickly as possible.

9. It may be that the rate of displacement by each pump is controlled by flow-rate, or by closed-loop motor speed control, but with a set pressure limit at the output of the respective pump, implemented either by a pressure relief valve or by closed-loop control of the rate of displacement of the pump, using a pressure transducer which measures the pressure of the hydraulic fluid output by the pump. Such a pressure limit may be reached in a transient due to the torque required to accelerate the inertia of the rotor rather than the steady-state torque due to the rotor aerodynamics. It is desirable not to waste energy over the relief valve, which should be kept for safety purposes in event of failure e.g. rotor entanglement or ground strike. Therefore the threshold pressure level, for the pressure relief valve or closed-loop control, should be set accordingly. This set limit may be dynamically controlled such that when it is known that a high pressure will be required to accelerate the inertia of the rotor, the level may accordingly, for a limited time, be set to a higher level.

10. The controller may be configured (programmed) to implement an anti-stall procedure (to avoid stalling of the prime mover) in which the torque generated by the pumps is limited (e.g. restricting the rate of displacement of hydraulic fluid by the pumps) in response to determining that the speed of rotation of the prime mover output shaft meets one or more stall risk criteria (e.g. that the speed of rotation has dropped below a threshold). The controller may be programmed to cause the pumps to make no net displacement of working fluid when the speed of rotation of the output shaft of the prime mover is below a minimum speed (e.g. by implementing only inactive cycles). This avoids stalling at start-up or during a warm-up phase (e.g. when the vehicle resting on a support (e.g. on the ground)).

11. For a quadcopter, it is necessary to have independent control of the speed of each rotor to control all 6 axes of motion of the multicopter (pitch, roll and yaw rotation and up/down, forwards/backwards and left/right translation). For a multicopter with more rotors, e.g. an octocopter, it may be that two or more motors are coupled to the output of a single pump such that they are not independently controllable but operate together, either in fluid parallel or series configuration. Thus, for example, 8 rotors may be controlled by 4 pump outputs, each controlling 2 motors to have the same speed or torque.

12. In some embodiments of the present invention, in response to determining that one or more prime mover failure criteria are met (e.g. if the prime mover breaks, or loses power) the controller operates some of the motors as pumps (driven by the rotation of the respective rotor as the vehicle descends), thereby retarding the fall of the multicopter, storing kinetic energy in the rotation of the rotors. The hydraulic fluid output by the respective motors, acting as pumps, may be used to drive the respective pumps, and there may be a sprig clutch between the output shaft of the prime mover and the common shaft to allow the common shaft to continue to rotate even after the prime mover has stopped. Once the common shaft is rotating, other pumps, driven in effect by the rotors, may use the received energy to drive respective motors and thereby rotors, in order to control the motion of the multicopter. It may for example, be possible to maintain control during a descent with only three motors functioning (as motors) by allowing the multicopter to yaw continuously like a sycamore tree seeds, while still providing enough thrust with the remaining three rotors to control the descent, although the landing maybe dangerous to the multicopter itself due to its high yaw rate.

13. In some embodiments, the motors are arranged in a coaxial arrangement, for instance two motors may be arranged coaxially, e.g. on each of three or four arms of the vehicle.

14. Although the rotors may each be of the same dimension and/or pitch, in some embodiments, the rotors are of different (e.g. a mixture of) dimensions and/or pitch. Two rotors, aligned on the forward/backward axis, may have smaller pitch and larger diameter than two rotors on the left/right axis. Those aligned on the forward/backward axis may be prioritised to provide the majority (or at least 75% or at least 90%) of the thrust during hover; the two rotors on the left/right axis may be used predominantly for roll stabilisation. Two rotors may have larger pitch and smaller diameter than any other rotor, and controlled to provide the majority (or at least 75% or at least 90%) of the thrust in forward flight. Alternatively, there could be one central rotor which provides the majority (or at least 75% or at least 90%) of the thrust, and three or more auxiliary rotors which are oriented at tilted angles to provide counter-torque.

Figure 6:
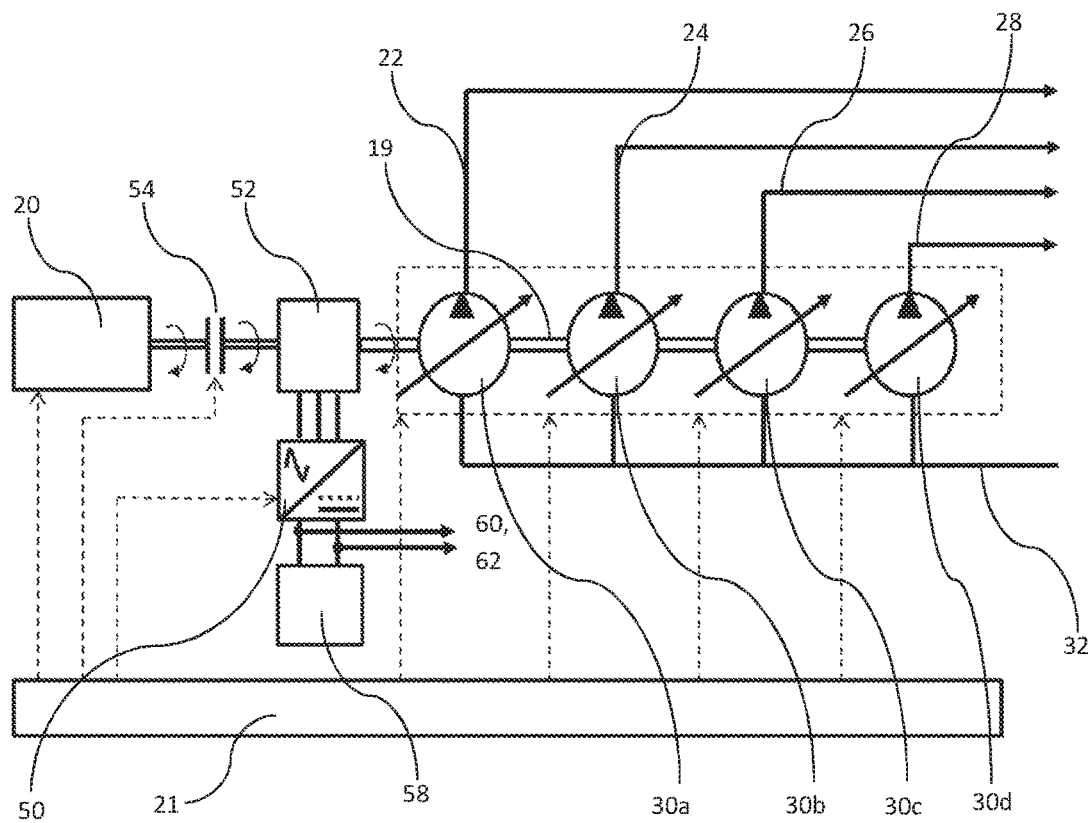
FIG. 6 is a multi-rotor first hybrid configuration
Figure 7:
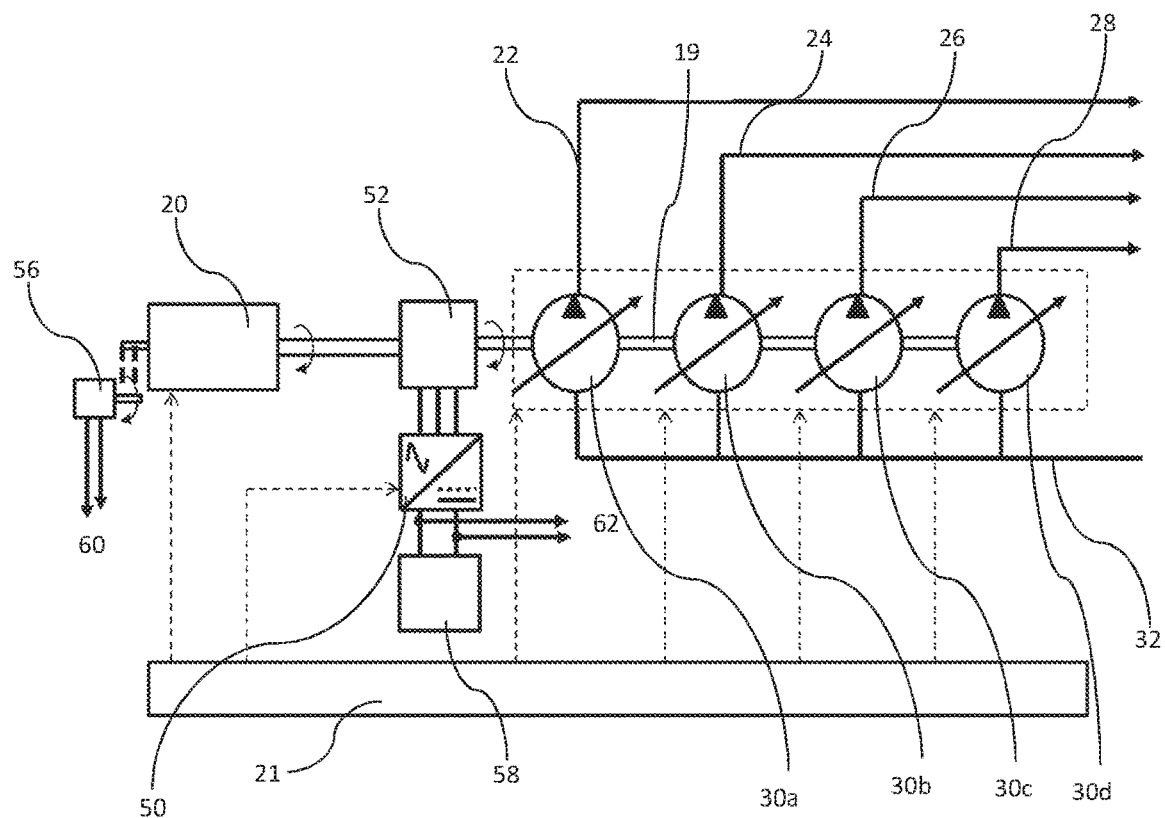
FIG. 7 is a multi-rotor second hybrid configuration

Each of the dashed lines connected to controller 21 in FIGS. 6 & 7 represents a control line, along which a signal is typically sent from the controller, and/or signals may be provided from the respective component back to the controller. The inverter 50 for example may provide the controller an indication of speed, or current along the respective signal path. The dashed line around the pumps 30 represents a single region of control for governing all of the pumps, and the unified region or element may be a further controller, which is primarily dedicated to control of the pumps individually. The main controller 21 and the pump controller must coordinate their systems in order to properly control the overall system.

FIG. 6 shows a hybrid configuration in which the prime mover 20 can be clutched out and idled, and even stopped, when not needed or desired (e.g. glide descent, or low noise operation). An electric machine 22 can assist the prime mover during high power demand (e.g. during vertical take-off or landing) or can provide pump power alone.

The electric machine can work as generator to charge a battery 58 and/or power low voltage 60 and high voltage 62 electric consumers when the prime mover is providing power. The clutch 54 could be a sprag (one-way, freewheel) clutch. This allows the prime mover to stop while the pump continues to rotate under power from the electric machine. Or it can be a two-way clutch which is actuated by command from the controller 21.

Generator 56 and primer move 20 are torque connected such that rotation of the prime mover causes rotation of the generator and production of electricity to supply to low voltage electric consumers.

The electric machine could rotate and start the prime mover (e.g. by slipping the clutch, which may be a fixed partially engaged/disengaged point, or by repeatedly cycling the clutch between at least partially engaged and at least partially disengaged), although the available pump power may be reduced momentarily due to the high load of both starting the prime mover and continuing to power the pump. A dedicated starter motor for the prime mover may be preferred to prevent such interruption.

In a further hybrid configuration, as shown in FIG. 7, the prime mover is always coupled to the pump, through the electric machine. A Generator powered by the prime mover can supply the low voltage electrical consumers.

The electric machine can assist the prime mover during high power demand (vertical take-off). Electric machine can work as generator to charge battery and/or power high voltage electric consumers. The electric machine could rotate and start the prime mover at the start of the flight.

Figure 8:
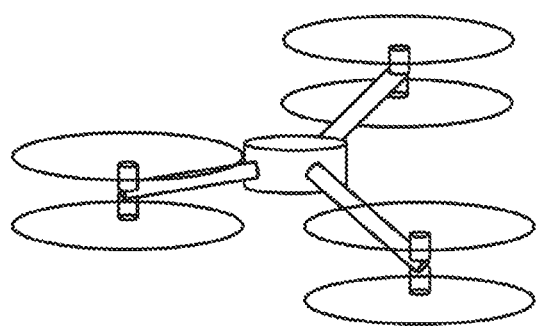
FIG. 8 is a multi-rotor in the form of a Y6 coaxial tricopter

FIG. 8 simply shows the form of a standard Y-shape multi-rotor. The six in 'Y6' is a reference to the number of rotors. Each arm has a pair of rotors which counter-rotate, each rotor, or each pair of rotors, in driven by an individual hydraulic motor. One skilled in the art is familiar with the advantages yielded by such shape and arrangement of rotors.

Figure 9:
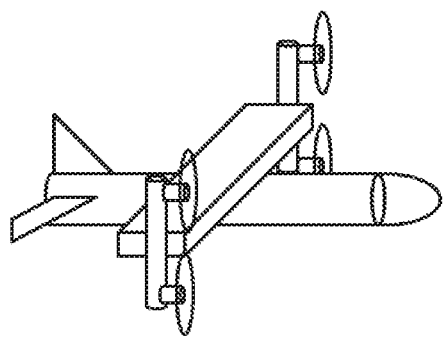
FIG. 9 is a multi-rotor in the form of a tiltrotor in a forward flight configuration

FIG. 9 is a vehicle arranged as a tiltrotor in a forward flight configuration.

Figure 10:
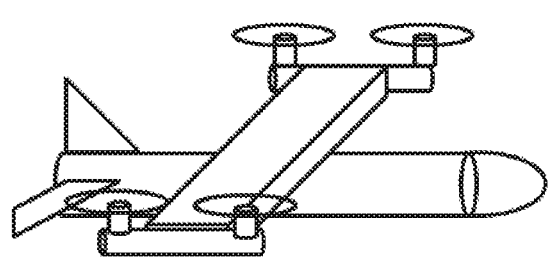
FIG. 10 is a multi-rotor in the form of a tiltrotor as per FIG. 9, but in a vertical flight configuration

FIG. 10 is a tiltrotor, the same as illustrated in FIG. 9, but in a vertical flight configuration. As per the name, the rotors (and their immediately adjacent structure) tilt, but the wing remains in a fixed position.

Figures 11, 12:
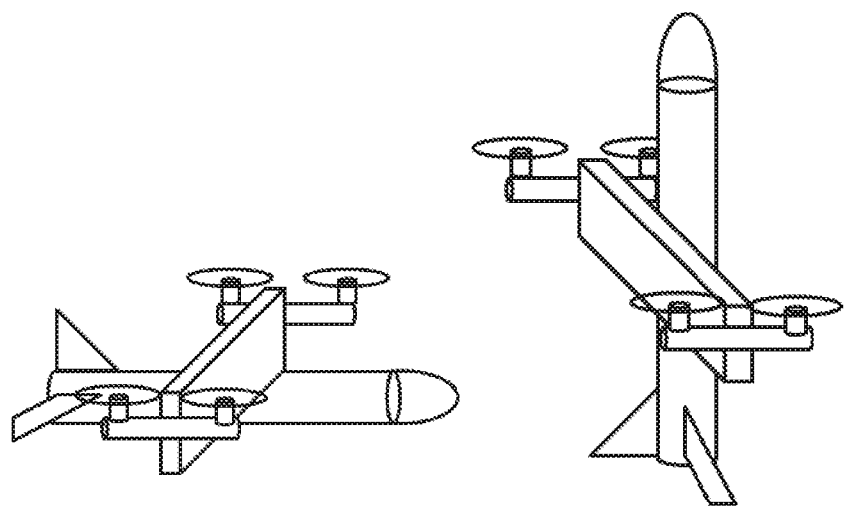
FIG. 11 is a multi-rotor in the form of a tiltwing in a vertical flight configuration
FIG. 12 is a multi-rotor in the form of a tail sitter in a vertical flight configuration

FIG. 11 is a tiltwing, shown in a vertical flight configuration. When in a horizontal flight configuration, it adopts the same appearance as the vehicle illustrated in FIG. 9. As per the name, the wing rotates (along with the connected rotors and immediately adjacent structure).

FIG. 12 is a tail sitter (a type of vertical landing and/or take off air vehicle), shown in a vertical flight configuration. When in a horizontal flight configuration, it adopts the same appearance as illustrated in FIG. 9. The rotors (and their immediately adjacent structure) tilt, but the wing remains in a fixed position.

Figure 13:
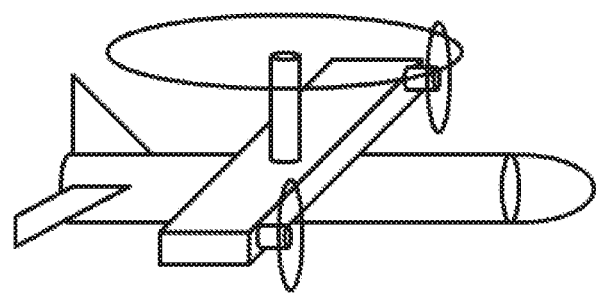
FIG. 13 is a multi-rotor in the form of a compound helicopter

FIG. 13 is a compound helicopter, having a main rotor providing vertical thrust, and additional horizontally mounted rotors to provide forward thrust on the vehicle. The rotors, their immediately adjacent structure, and the wing remain in a fixed position for all flight configurations.

Figure 14:
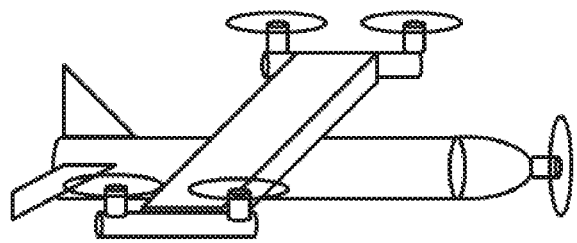
FIG. 14 is a multi-rotor in the form of a compound rotorcraft

FIG. 14 is a compound rotorcraft, shown with four vertical axis rotors providing vertical thrust, and an additional horizontal mounted rotor to provide forward thrust on the vehicle. The rotors, their immediately adjacent structure, and the wing remain in a fixed position for all flight configurations.

Figure 15:
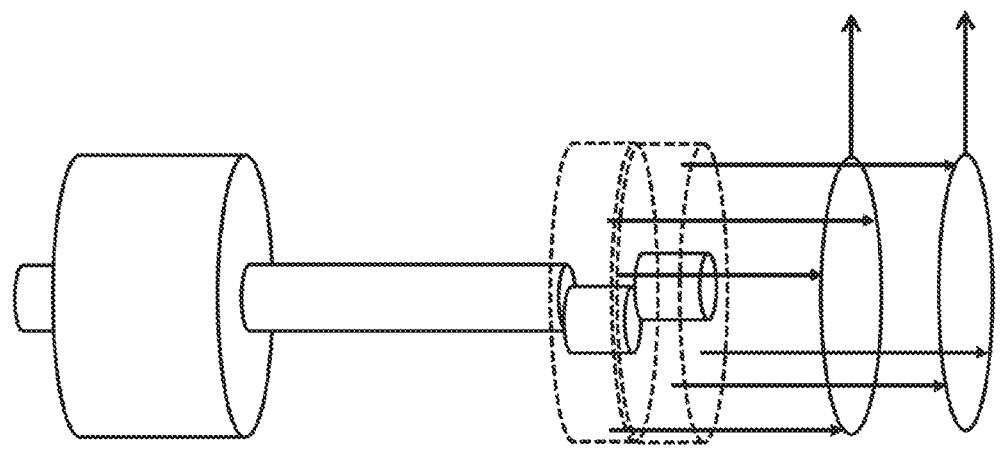
FIG. 15 is an image showing banks of a rotary machine with axial galleries, and pump services connected to one side.

FIG. 15 is an image showing banks of a rotary machine, each bank aligned with a separate eccentric portion of the crankshaft, each bank having connected axial galleries, and services connected to one side. In the illustrated embodiment, 3 axial galleries extend from the left hand bank and meet at the left hand pump service ring/connection, and 3 axial galleries extend from the right hand bank and meet the right hand pump service ring/connection. Each bank is galleried separately.

High payload aerial craft typically rely on large diameter rotors, where such rotor growth also increases the rotational resistance to motion. This is due to both increased rotating mass, but also increased blade area which displaces air. This increase in inertia must be taken into account in the control system, especially in meeting the requirement of a minimum control bandwidth to maintain overall controllability of the aerial craft.

In respect of the increase in inertia, from large diameter rotors, one option for the hydraulic machine sizing is to increase the size of the hydraulic motor and/or pump, such that a fixed % small increase in displacement, in a larger motor, has the effect of increasing the pressure more quickly. For a larger machine, an increase in displacement demand from 20-30% will result in a greater pressure change than for a small machine.

A further option in relation to the increase in inertia, from large diameter rotors, is to change the pressure map (or table) in the controller, such that (in the instance of increasing the rotor speed) the controller causes the system pressure to rise to an elevated level which exceeds the steady state required pressure level of the newly demanded rotor speed. Once the new speed is achieved, the pressure may be allowed to drop to a new level, but the elevated 'excess' pressure level is maintained as long as the blade speed is below demanded.

In contrast where a rotor speed must decrease quickly, instead of dropping motor displacement in reference to a steady-state pressure which corresponds to the new speed, the rotor speed may be obtained more quickly by dropping the displacement % to zero for a short period of time. Reducing motor displacement to zero may cause the pressure to increase in the delivery channels. The speed of response of the hydraulic motor may outstrip the speed with which the pump output can decrease. The rotor speed drop will occur due to friction in the drivetrain, and wind resistance against the rotor blades.

FIG. 16 is a graph showing pressure:speed relationship, and a two-point transition, with an arrow for increase in speed transition, and a further arrow for decrease in speed transition.

FIG. 17*a* is a graph of speed showing transition from point (1) to point (2) on the previous pressure/speed graph (FIG. 17).

Figure 18A:
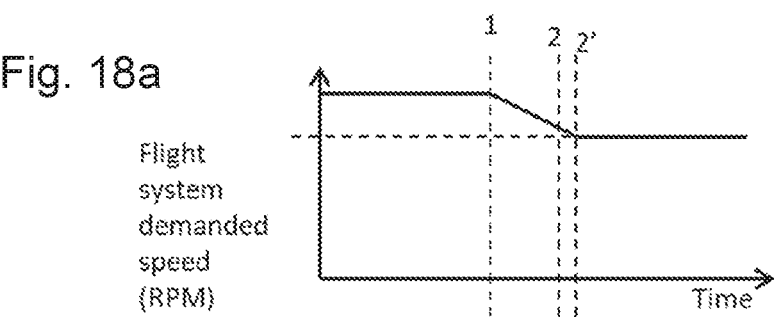
FIG. 18a is a graph of flight system demanded speed against time.

FIG. 17*b* is a magnified view of a portion of the graph shown in FIG. 18*a*, showing detail of the demanded speed, the actual speed with the invention, and the actual speed without the invention.

FIG. 17*c* is a graph of system pressure showing transition from point (1) to point (2) on the previous pressure/speed graph (FIG. 17).

FIG. 17d is a graph of pump controller displacement command showing transition from point (1) to point (2) on the previous pressure/speed graph (FIG. 17).

Looking at FIGS. 17a/17b/17c/17d together, following the increase in demanded speed, the pump controller increases displacement to maximum (100% saturation) for a brief period, between time 1 and 1'. During this period, the system pressure ramps quickly to maximum set pressure, although there is a slight delay as speed change lags the change in the motor controller. Acceleration will be near maximum. Once the maximum set pressure is reached, the pump controller reduces its displacement command, to around the original level, and then gradually increases to hold pressure at maximum set pressure, causing acceleration to be at maximum. Once the desired speed is achieved, the pump displacement is reduced to zero for a brief period, between time 2 and 2', in order to bring the system pressure down quickly, thus avoiding speed overshoot. By setting the motor to zero displacement, it may be set to idle mode (i.e. low pressure breathing mode). The displacement demand is held at zero until a pressure is achieved (set pressure 'Ps2'), which will hold the speed at the new higher speed. At this point, displacement command is increased such as to hold the pressure at level Ps2. These transitions and choices of displacement fraction at various times are made according to respective tables/lookup maps.

In detail, looking at the speed response which occurs without the invention (dotted line), it reacts more slowly than with the invention taking until around time 1' before speed change starts to occur. In contrast the invention causes the speed increase to occur around 1, and between 1 and 2 to it accelerate at a higher rate, thus reaching the demanded speed sooner (time x, instead of around 5). The original method is subject to speed overshoot (peaking at point 3), and speed undershoot (reaching a minimum undershoot at point 4), and then later (at point 5) the actual speed matches the demanded speed. In contrast, using the invention, once the actual speed meets the demanded speed, it soon then matches the demanded speed (at time x). Although one skilled in the art will recognise that this is a somewhat idealised representation, the essential advantages are clear compared to operation, and reaction to speed changes, without the invention.

The demanded speed levels are demanded by the flight system (for example to climb as demanded by the pilot, or for example to increase one rotor speed to maintain horizontal flight compensating for perturbation like a gust of wind). It is the aim of the motor controller, on receiving a speed demand, to meet this speed rapidly, and accurately.

FIG. 18a is a graph of flight system demanded speed showing a drop from point 1 to point 2, which corresponds on the previous pressure/speed graph (FIG. 17) of a drop from point 2 to point 1.

Figure 18B:
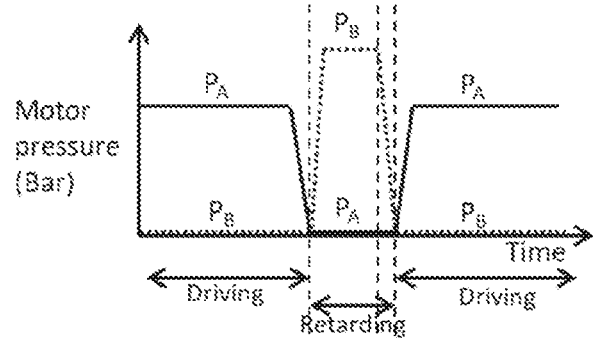
FIG. 18b is a graph of motor pressure against time.

FIG. 18b is a graph of system pressure which corresponds on the previous pressure/speed graph (FIG. 17) of a drop from point 2 to point 1. There are two motor pressures shown: $P_A$ and $P_B$. When $P_B > P_A$=Retarding. When $P_A > P_B$ Driving.

Figure 18C:
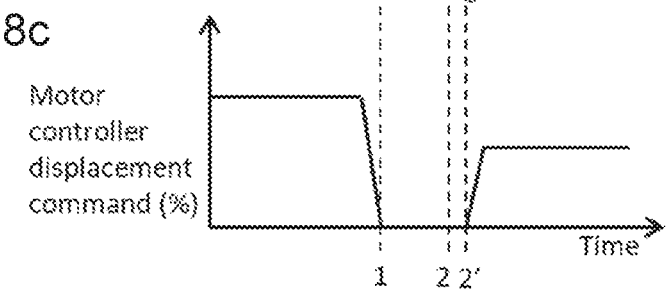
FIG. 18c is a graph of motor controller displacement command against time.

FIG. 18c is a graph of pump controller displacement command which corresponds on the previous pressure/speed graph (FIG. 17) of a drop from point 2 to point 1. After time 2', the new displacement is lower than previously, because new speed requirement demand is lower.

In a further embodiment, negative torque could be applied to the rotor, in order to drop the rotation speed even more quickly. Looking at FIGS. 18a/18b/18c together, following the decrease in demanded speed (starting at time 1), the pump controller sharply ramps the commanded displacement to zero. The motor pressure may be the pressure of a first main connected port or a second main connected port. Pressure $P_A$ sharply falls. As the pressure $P_A$ falls below the "cracking" pressure of the over centre valve ('OCV') Pilot A, the OCV closes and acts to throttle the flow. This raises pressure $P_B$ causing the motor to retard the motor. The maximum retarding torque is reacted when pressure $P_B$ reaches the maximum, as determined by the cracking pressure of the OCV pilot port B. Once the motor has decelerated to the new demanded speed at 2', the pump flow rises to match the consumption of the motor, and the pressure $P_A$ becomes higher causing the OCV to cease throttling the flow.

As a supplement in a combined simultaneous electric and hydraulic mode, or instead of the ability of the hydraulic motors to enter a pumping mode, there may be electrical motor driven rotor or rotors, which can reverse torque. These electric motors may drive the same, or separate rotors from those driven by the hydraulic motors. The electric motors may be used to decelerate the rotors driven by the hydraulic motors, then be used to accelerate the rotors in a reverse direction. During this deceleration acceleration phase, the hydraulic motors may be idled or enter a low power mode. It may be that the electric motors are better suited to torque reversal and to regeneration and thus rotor torque reversal required for aerial vehicle maneuvers may be reserved wholly or in part for the electric motors. The electric motors may be used to drive the corresponding rotor or rotors during normal operation, or may be used during periods of high maneuverability requirements, potentially to boost total power, possibly in the event of failure of a rotor drive component, and or to temporarily or ordinarily raise the bandwidth of control of the aerial vehicle.

In some embodiments, there is redundancy of some or all of the motors, rotors, pumps, hoses and prime mover.

For example, there may be multiple groups, each comprising a plurality of pumps which direct fluid to a common hydraulic connection which is connected in turn to one, or a plurality of hydraulic motors. Thus, there is redundancy of pumps (and optionally motors) enabling one to take over if another fails. There could be check valves between the hydraulic connections so there is no leakage between them.

It may be that for some or all of the rotors, there is a second backup drive mechanism, for use in the event of a failure of the motor which is coupled to the rotor to drive the rotor during normal use (the first rotor). For example, a gear train could be provided which through which a motor (the second motor) which primarily drives a second rotor might selectively supplement or take over driving of a first rotor, e.g. in the event of failure of its respective motor (the first motor).

The plurality of pumps may comprise a further pump which, in a normal operating mode, does not drive a first motor but which, in the event of a failure of the pump which drives the first motor during normal operation, is controlled to supply hydraulic fluid to the first motor. The further pump may be unused during normal operation or may be used to drive a different motor during normal operation (but typically prioritising the first motor in the event of failure of the shaft driven pump).

In some embodiments, there is both a prime mover and a secondary mover, which typically has a lower maximum power output, both of which are coupled to the pumps. It may be that both the prime mover and the secondary mover operate concurrently to drive the pumps during normal operation. In the event of failure of the prime mover, the secondary mover may continue to function. Typically, the secondary mover can, for a period of time, provide sufficient power to the hydraulic system to maintain speed/attitude/position of the copter. Being larger capacity, the prime mover is typically capable of solely fulfilling power requirements of the vehicle, in the event of failure of the secondary mover.

Where there is a both a prime mover and secondary mover, it may be that they are coupled to opposite ends of a common shaft, which drives one or more or all of the pumps, therebetween. This arrangement is suitable if the prime mover and secondary mover have corresponding size and/or maximum power output and/or are not designed for one to continue operate in the event of the failure of the other. Alternatively, the secondary mover may have a rotatable shaft which is coupled to the output shaft of the prime mover in series to one side of the plurality of pumps.

In respect of sizing the secondary mover, possibly an internal combustion engine, it could be specified (max power, etc) such as to maintain a controlled descent in the event of failure of the primary engine with a given payload, or could perhaps operate in a time-limited boost regime. Such boost regime may well provide unsustainable stress to the secondary engine and is not designed for prolonged use. This boost-regime period provides sufficient time to land, or to reach a service centre, or some specified, possibly pre-set, landing location.

REFERENCE NUMERALS

10—Multicopter (quadcopter embodiment as illustrated in FIG. 1)
12—Core (containing power supply and electronically (synthetically) commutated pumps 30)
13—Power supply (prime mover, e.g. electric generator, plus power source, e.g. battery)
14a,14b,14c,14d—Rotor (first, second, third, fourth)
16a,16b,16c,16d—Electronically (synthetically) commutated motor/housing
18—Low pressure connection between pumps and respective hydraulic motor output
19—Common shaft
20—Prime mover
21—Controller
22—High pressure connection between pump 30a and hydraulic motor 40d
24—High pressure connection between pump 30b and hydraulic motor 40c
26—High pressure connection between pump 30c and hydraulic motor 40b
28—High pressure connection between pump 30d and hydraulic motor 40a
30a, 30b, 30c, 30d—Electronically (synthetically) commutated pumps (first, second, third and fourth shaft-driven hydraulic machines)
32—Common low pressure manifold
33—Input torque demanded of the prime mover
34—Output target torque or speed demand (1 per pump)
36—Multicopter structural support, arm
38—Accumulator
40a, 40b, 40c, 40d—Electronically (synthetically) commutated motors (first, second, third and fourth rotor-driving hydraulic machines)
45a, 45b, 45c, 45d—Overcentre Valves (OCVs) functioning as control valves
46—Check valves
47—Autorotation solenoid valve
48—Tank
49—Heat exchanger
50—Inverter
52—Electric machine
54—Clutch
56—Generator
58—Battery
60—To low voltage electric consumers
62—To high voltage electric consumers 100—Cylinders
102—Cylinder working volumes
106—Pistons
108—Rotatable shaft
110—Eccentric cam
112—Shaft position and speed sensor
114—Signal line
116—Machine controller
118—Low pressure valves
120—Low pressure hydraulic fluid line
122—High pressure hydraulic fluid line
124—Low pressure valve control line
126—High pressure valves
128—Pressure relief valve
132—HPV control line
150—Processor
152—Bus
154—Memory
156—Operating program
158—Electronic interface
160—Rotor speed signal
162—Rotor speed sensors
164—Rotation speed signal (from gyroscope)
166—3-axis gyroscope
168—Acceleration signals
170—3-axis accelerometer
172—Magnetic field strength measurements
174—Magnetometer
176/178—Speed of rotation and/or position signals
180—Longitude, latitude and altitude data
182—Global navigation satellite system receiver
184—Current power output signal
186—Battery reserve signal
188—Control instructions
190—Wireless communications interface
200—Valve control signals
202—Prime mover control signals
204—Reporting data

The invention claimed is:

1. A multi-rotor aerial vehicle comprising:
at least two rotors which generate aerodynamic thrust on the vehicle,
a controller, a power supply, an output shaft driven by the power supply, and at least one shaft-driven hydraulic machine mechanically coupled to the output shaft,
at least two rotor-driving hydraulic machines each of which drives a respective rotor,
wherein the at least two rotor-driving hydraulic machines are hydraulically coupled to and thereby driven by the at least one shaft-driven hydraulic machine,
at least one of said hydraulic machines being an electronically commutated hydraulic machine,
the at least one electronically commutated machine comprising a plurality of working chambers of cyclically changing volume and one or more fluid outlets or inlets, each said fluid outlet or inlet being fluidically connected to a respective group of said working chambers, wherein the displacement of hydraulic fluid through each working chamber is regulated by one or more electronically controllable valves, during each cycle of working chamber volume, in phased relationship to cycles of working chamber volume, to thereby regulate the net displacement of hydraulic fluid through the fluid outlets or inlets,
   wherein the controller controls the electronically controllable valves of the at least one electronically commutated hydraulic machine to thereby independently control the flow of hydraulic fluid through the respective hydraulic machines to thereby independently control the speed of rotation of the at least two rotors.

2. A multi-rotor aerial vehicle according to claim 1, wherein the at least one shaft-driven hydraulic machine is a said electronically commutated hydraulic machine, and the working chambers of the at least one shaft-driven hydraulic machine comprise at least a first group of one or more working chambers connected to a first fluid outlet which is hydraulically coupled to and thereby drives a first rotor-driving hydraulic machine which drives a first rotor, and the at least one shaft-driven hydraulic machine also comprises at least a second group of one or more working chambers connected to a second fluid outlet which is hydraulically coupled to and thereby drives a second rotor-driving hydraulic machine which drives a second rotor, and
   wherein the controller controls the electronically controlled valves of the first and second groups of working chambers to independently control the net displacement of hydraulic fluid through the first and second fluid outlets, thereby independently driving the first rotor-driving hydraulic machine and second rotor-driving hydraulic machine and thereby independently controlling the respective speed of rotation of the first and of the second rotors.

3. A multi-rotor aerial vehicle according to claim 2, wherein the rate of displacement from individual groups of one or more working chambers is controlled using open loop feedback to produce a set flow-rate, to thereby control the thrust generated by the respective rotors, the rotor-driving hydraulic machines are fixed displacement, and these fixed displacement machines turn at a speed which is proportional to the rate of fluid flow from the respective group of one or more working chambers to the respective rotor-driving hydraulic machine, and the controller queries stored conversion data which relates a target thrust or variable related to thrust to pump flow-rate, and controls the flow rate of hydraulic fluid from the respective group of one or more working chambers through the fluid outlet to the respective rotor-driving hydraulic machine accordingly.

4. A multi-rotor aerial vehicle according to claim 2, wherein to control the thrust of a respective rotor, the rate of displacement of hydraulic fluid by the respective group of one or more working chambers through a fluid inlet is controlled using closed-loop feedback to maintain a target pressure using feedback from a pressure transducer which measures the pressure of hydraulic fluid output by the respective group of one or more working chambers through the respective fluid inlet.

5. A multi-rotor aerial vehicle according to claim 2, wherein to control the thrust of a respective rotor, the rate of displacement of hydraulic fluid by the respective group of one or more working chambers through a respective fluid outlet is controlled using closed-loop feedback to obtain a target rotor speed, using a rotor speed transducer.

6. A multi-rotor aerial vehicle according to claim 2, wherein the rate of displacement by each shaft-driven hydraulic machine is controlled by flow-rate, or by closed-loop rotor driving hydraulic machine speed control, but with a set pressure limit at the output of the respective shaft-driven hydraulic machine, implemented by closed-loop control of the rate of displacement of the shaft-driven hydraulic machine, using a pressure transducer which measures the pressure of the high pressure connection between the shaft-driven hydraulic machine and respective rotor-driving hydraulic machine.

7. A multi-rotor aerial vehicle according to claim 1, wherein the at least two rotor-driving hydraulic machines are each said electronically commutated hydraulic machines, and which have fluid inlets which are hydraulically coupled to the same one or more fluid outlets of the at least one shaft-driven hydraulic machine such that they receive hydraulic fluid from and are driven by a common fluid supply, and
   wherein the controller controls the electronically controlled valves of the at least two rotor-driving hydraulic machines to independently control the net displacement of working fluid by the rotor-driving hydraulic machines and thereby independently control the speed of rotation of the respective rotors driven by the at least two rotor-driving hydraulic machines.

8. A multi-rotor aerial vehicle according to claim 1, wherein the at least one shaft driven hydraulic machine comprises a plurality of working chambers axially distributed along a single rotatable shaft coupled to the output shaft of the power supply.

9. A multi-rotor aerial vehicle according to claim 1, wherein said one or of the electronically commutated hydraulic machines has a body, the body encompassing the one or more working chambers and the electronically controllable valves of the hydraulic working machine, the body having a pair of bearings mounted thereto, with all working chambers of the machine located between the pair of bearings and without additional bearings between the working chambers.

10. A multi-rotor aerial vehicle according to claim 1, further comprising one or more orientation sensors wherein the controller is configured to process the output of the one or more orientation sensors and to control the electronically controlled valves to control the displacement of hydraulic fluid by the electronically commutated hydraulic machine(s) to thereby regulate the stability, orientation and/or direction of movement of the multi-rotor aerial vehicle.

11. A multi-rotor aerial vehicle according to claim 1, wherein the controller is configured to vary the speed of rotation of the output shaft and/or the power output of the power supply to provide just enough power for hovering, typically plus a predetermined margin; and to then increase the speed of rotation of the output shaft and/or the power output of the power supply whenever higher power is required or is forecast to be required for acceleration, climbing or maneuvering.

12. A multi-rotor aerial vehicle according to claim 1, wherein the electronically commutated hydraulic machine (s) are controlled to independently regulate the torque generated by each of the two or more rotor-driving hydraulic machines.

13. A multi-rotor aerial vehicle according to claim 1, wherein some or all of the shaft-driven hydraulic machines are pump-motors, at least one of those pump-motors is connected to an accumulator and the pump-motor(s) connected to an accumulator can be operated in a pumping mode to store pressurised fluid in the accumulator and then later motored, driven by pressurised fluid from the accumulator, to provide transient additional power, to supplement the power output by the power supply.

14. A multi-rotor aerial vehicle according to claim 1, wherein the controller is configured to implement an anti-stall procedure in which the torque generated by the one or more shaft-driven hydraulic machines is limited in response to determining that the speed of rotation of the output shaft of the power supply meets one or more stall risk criteria.

15. A multi-rotor aerial vehicle according to claim 1, wherein the controller is configured such that in response to a rotor demand speed increase from a first lower level to a second higher level, the flowrate delivered by the common outlet of the one or more shaft-driven hydraulic machines to which a rotor-driving hydraulic machine is connected, is commanded by the controller to exceed the flowrate corresponding to the steady-state flowrate of the second higher level of speed, for a period of time.

16. A multi-rotor aerial vehicle according to claim 1, wherein the controller is configured such that in response to a rotor demand speed decrease from a first higher level to a second lower level, the flowrate delivered by the one or more groups of working chambers connected to the common hydraulic fluid outlet to which the respective rotor-driving hydraulic machine is connected, is commanded by the controller to decrease below the flowrate corresponding to the steady-state flowrate of the second lower level of speed, for a period of time.

17. A method of operating a multi-rotor aerial vehicle, the multi-rotor aerial vehicle comprising:
- at least two rotors which generate aerodynamic thrust on the vehicle,
- a controller, a power supply, an output shaft driven by the power supply, and at least one shaft-driven hydraulic machine mechanically coupled to the output shaft,
- at least two rotor-driving hydraulic machines each of which drives a respective rotor,
- wherein the at least two rotor-driving hydraulic machines are hydraulically coupled to and thereby driven by the at least one shaft-driven hydraulic machine,
- at least one of said hydraulic machines being an electronically commutated hydraulic machine,
- the at least one electronically commutated machine comprising a plurality of working chambers of cyclically changing volume and one or more fluid outlets or inlets, each said fluid outlet or inlet being fluidically connected to a respective group of said working chambers, wherein the displacement of hydraulic fluid through each working chamber is regulated by one or more electronically controllable valves, during each cycle of working chamber volume, in phased relationship to cycles of working chamber volume, to thereby regulate the net displacement of hydraulic fluid through the fluid outlets or inlets, the method comprising controlling the electronically controllable valves of the at least one electronically commutated hydraulic machine to thereby independently control the flow of hydraulic fluid through the respective hydraulic machines to thereby independently control the speed of rotation of the at least two rotors.

18. A method according to claim 17, wherein the at least one shaft-driven hydraulic machine is a said electronically commutated hydraulic machine, and the working chambers of the at least one shaft-driven hydraulic machine comprise at least a first group of one or more working chambers connected to a first fluid outlet which is hydraulically coupled to and thereby drives a first rotor-driving hydraulic machine which drives a first rotor, and the at least one shaft-driven hydraulic machine also comprises at least a second group of one or more working chambers connected to a second fluid outlet which is hydraulically coupled to and thereby drives a second rotor-driving hydraulic machine which drives a second rotor, and
wherein the method comprises controlling the electronically controlled valves of the first and second groups of working chambers to independently control the net displacement of hydraulic fluid through the first and second fluid outlets, thereby independently driving the first rotor-driving hydraulic machine and second rotor-driving hydraulic machine and thereby independently controlling the respective speed of rotation of the first and of the second rotors.

19. A method according to claim 17, wherein the at least two rotor-driving hydraulic machines are each said electronically commutated hydraulic machines, and which have fluid inlets which are hydraulically coupled to the same one or more fluid outlets of the at least one shaft-driven hydraulic machine such that they receive hydraulic fluid from and are driven by a common fluid supply, and
wherein the method comprises controlling the electronically controlled valves of the at least two rotor-driving hydraulic machines to independently control the net displacement of working fluid by the rotor-driving hydraulic machines and thereby independently control the speed of rotation of the respective rotors driven by the at least two rotor-driving hydraulic machines.

20. A method according to claim 17, wherein the controller of the multi-rotor aerial vehicle is configured to control the electronically controllable valves of the at least one electronically commutated hydraulic machine to thereby independently control the flow of hydraulic fluid through the respective hydraulic machines to thereby independently control the speed to rotation of the at least two rotors.

* * * * *